United States Patent
Shirakawa

(10) Patent No.: US 10,853,477 B2
(45) Date of Patent: Dec. 1, 2020

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Yuki Shirakawa, Mitaka (JP)

(73) Assignee: CANON KABUSHIKI KAISHA, Tokyo (JP)

(*) Notice: Subject to any disclaimer, the term of this patent is extended or adjusted under 35 U.S.C. 154(b) by 295 days.

(21) Appl. No.: 16/105,114

(22) Filed: Aug. 20, 2018

(65) Prior Publication Data

US 2019/0073470 A1    Mar. 7, 2019

(30) Foreign Application Priority Data

Sep. 1, 2017  (JP) .................................. 2017-168272

(51) Int. Cl.
  *H04L 29/06*  (2006.01)
  *G06F 21/45*  (2013.01)
  (Continued)

(52) U.S. Cl.
  CPC .............. *G06F 21/45* (2013.01); *G06F 21/32* (2013.01); *G06F 21/604* (2013.01);
  (Continued)

(58) Field of Classification Search
  None
  See application file for complete search history.

(56) References Cited

U.S. PATENT DOCUMENTS 9,172,699 B1 * 10/2015 Vazquez ................. G06F 21/32
2006/0112182 A1    5/2006 Chen et al.
(Continued)

FOREIGN PATENT DOCUMENTS

EP    2343679 A1    7/2011
JP    2005275616 A    10/2005

OTHER PUBLICATIONS

Rodrigues, Marcus V. C. et al. Biometrics-Based Secret Key Agreement by Public Discussion with RFID System. 2014 International Conference on Cyberworlds. https://ieeexplore.ieee.org/stamp/stamp.jsp?tp=&arnumber=6980777 (Year: 2014).*
(Continued)

*Primary Examiner* — Jeremiah L Avery
(74) *Attorney, Agent, or Firm* — Rossi, Kimms & McDowell LLP

(57) ABSTRACT

A portable terminal has an authenticator for biometric authentication, and a TPM for storing biometric information of a user necessary when performing authentication processing with the authenticator and a secret key generated for the biometric information. At the time of initialization of an OS, the portable terminal transmits a request for a registration cancelation using a registration cancelation URL to a server in which registration information including a public key which is a pair with a secret key is registered. When an authentication request for the registration cancelation is received from the server, a signature is generated using the secret key extracted according to an authentication success in the biometric authentication of the authenticator using the biometric information read by the biometric information sensor, when the signature is successfully verified by being transmitted to the server, the registration cancelation of the registration information is performed in the server.

10 Claims, 17 Drawing Sheets

(51) Int. Cl.
*G06F 21/32* (2013.01)
*G06F 21/60* (2013.01)
*G06F 21/62* (2013.01)
*H04L 9/32* (2006.01)

(52) U.S. Cl.
CPC .......... *G06F 21/629* (2013.01); *H04L 9/3247* (2013.01); *G06F 2221/2117* (2013.01)

(56) References Cited

U.S. PATENT DOCUMENTS

| | | | |
|---|---|---|---|
| 2008/0091835 A1 | 4/2008 | Yuan | |
| 2013/0088327 A1* | 4/2013 | Takahashi | H04L 9/3231 340/5.82 |
| 2016/0014605 A1* | 1/2016 | Robinton | H04L 63/0876 726/6 |
| 2016/0087933 A1* | 3/2016 | Johnson | H04W 12/0023 709/245 |
| 2017/0078100 A1* | 3/2017 | Kusumi | H04L 63/205 |
| 2017/0272316 A1* | 9/2017 | Johnson | H04L 67/34 |

OTHER PUBLICATIONS

Chen, Tzer-Shyong et al. A novel key management scheme for dynamic access control in a user hierarchy. Proceedings of the 28th Annual International Computer Software and Applications Conference, 2004. COMPSAC 2004. https://ieeexplore.ieee.org/stamp/stamp.jsp?tp=&arnumber=1342869 (Year: 2004).*

Extended European Search Report issued in European Appln. No. 18188323.2 dated Oct. 19, 2018.

* cited by examiner

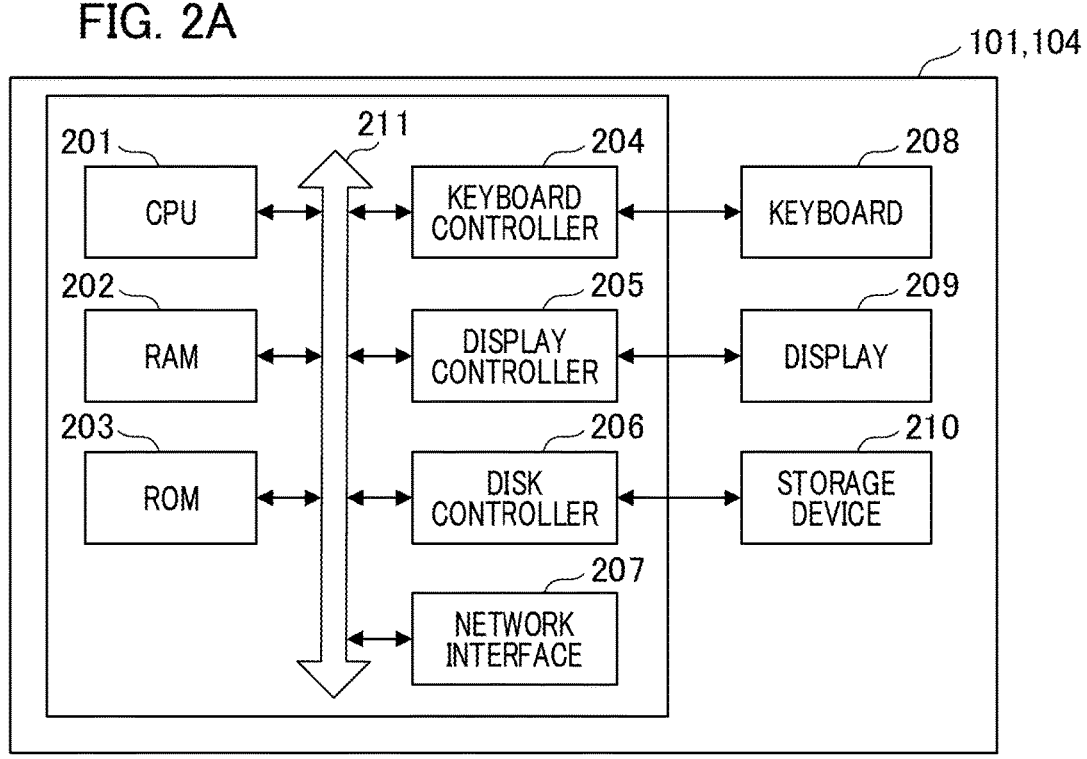
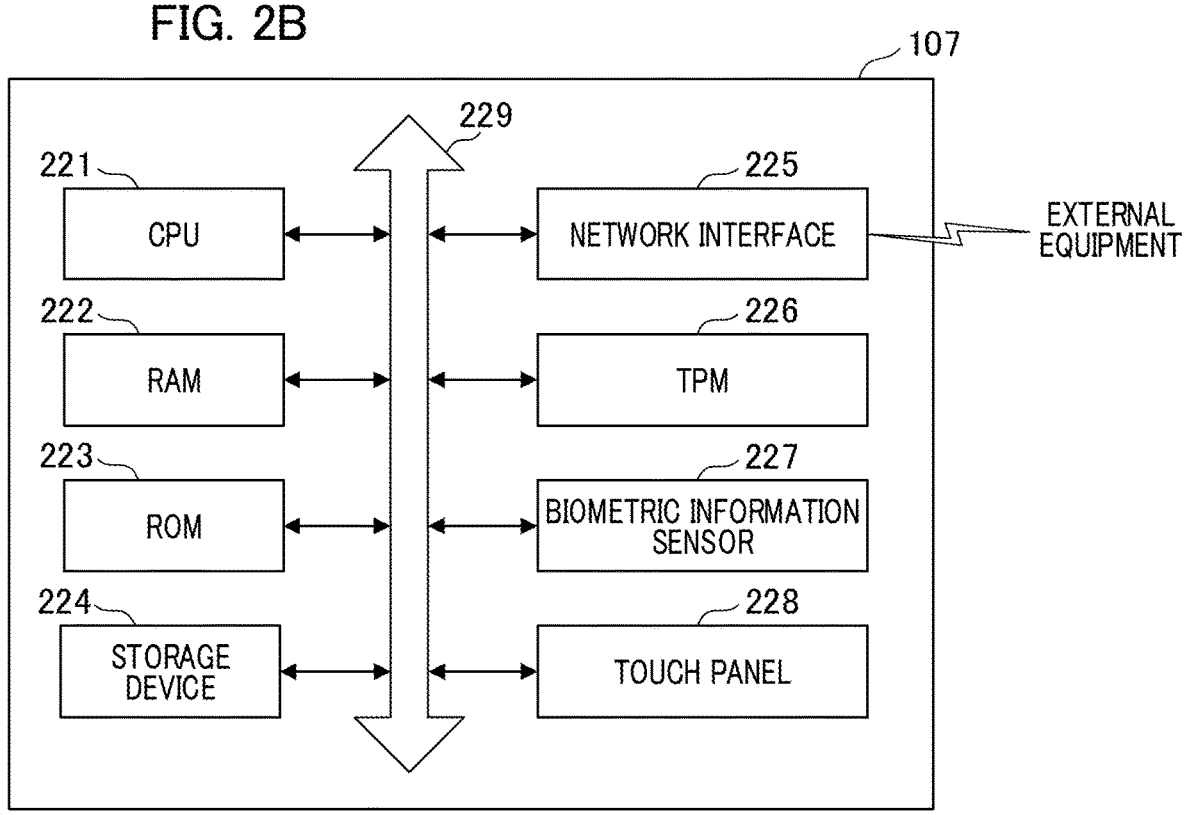

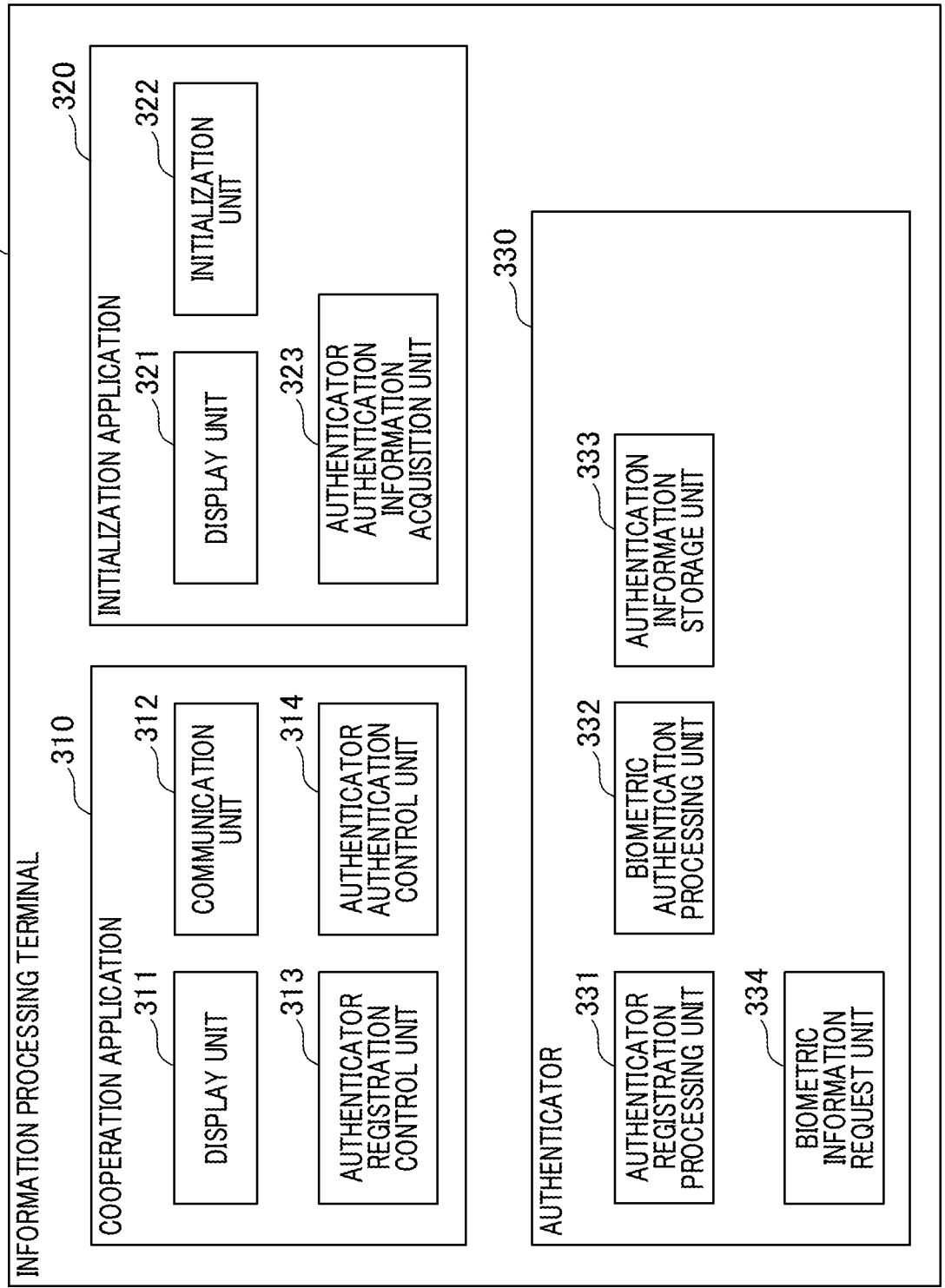

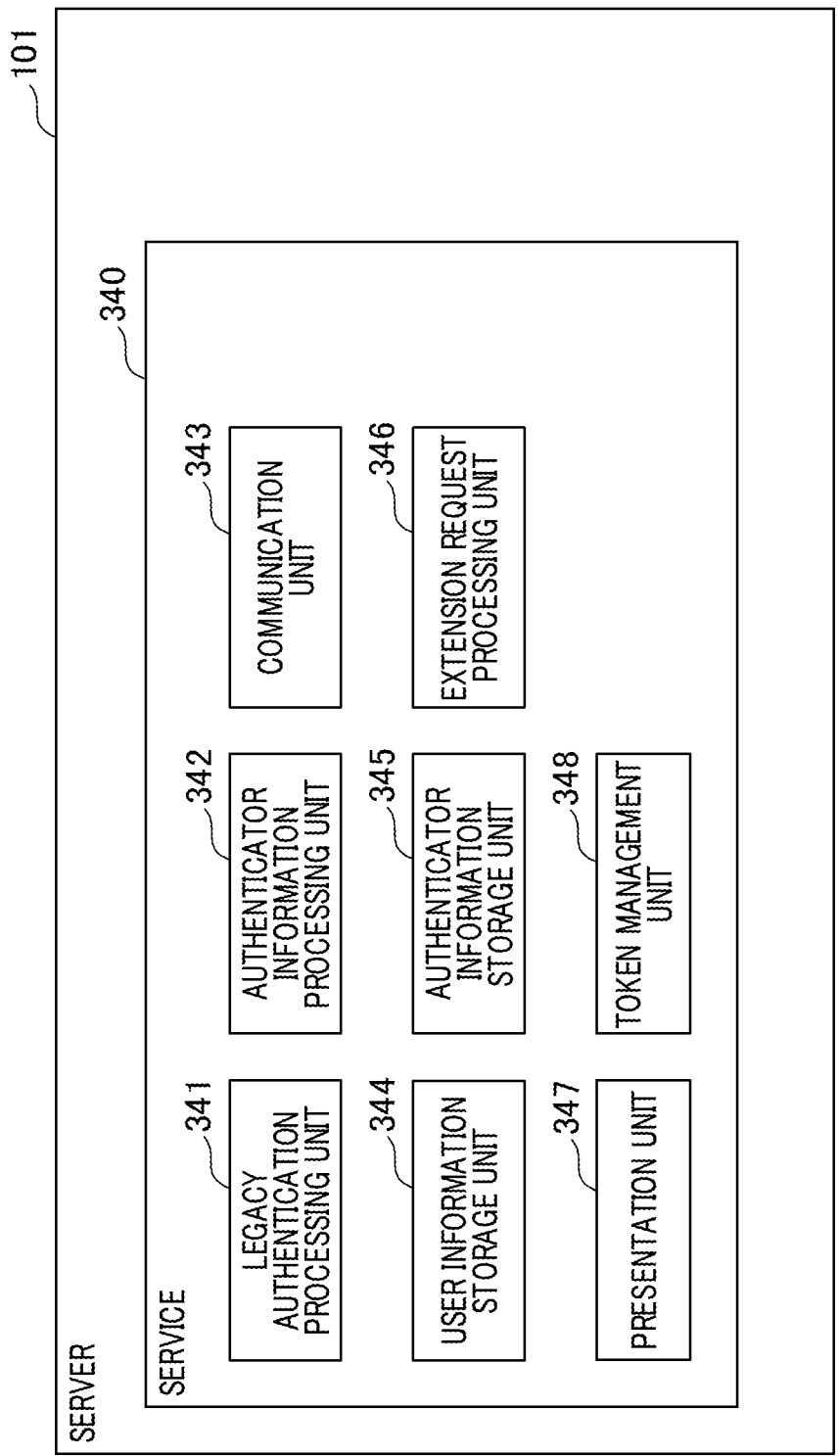

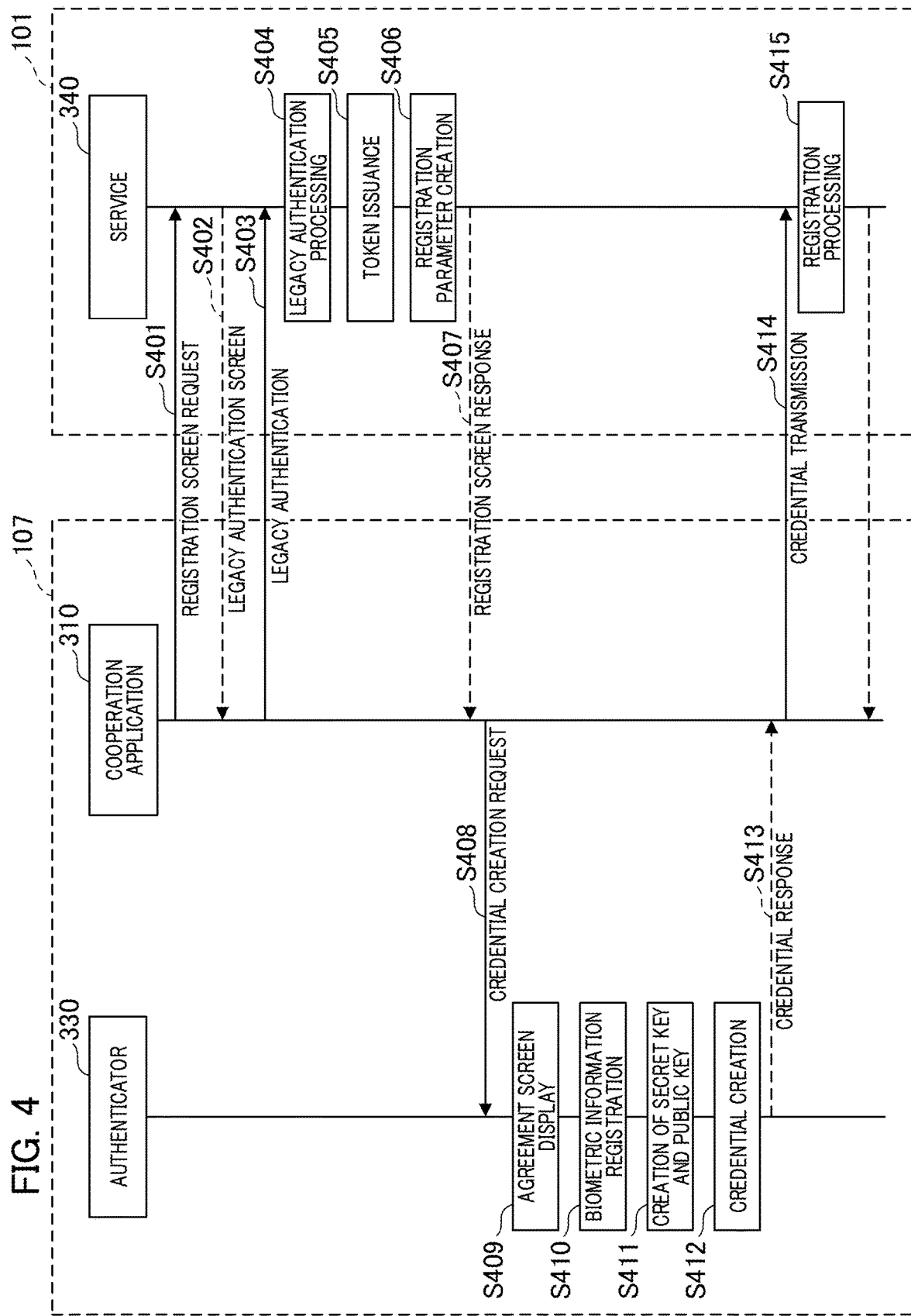

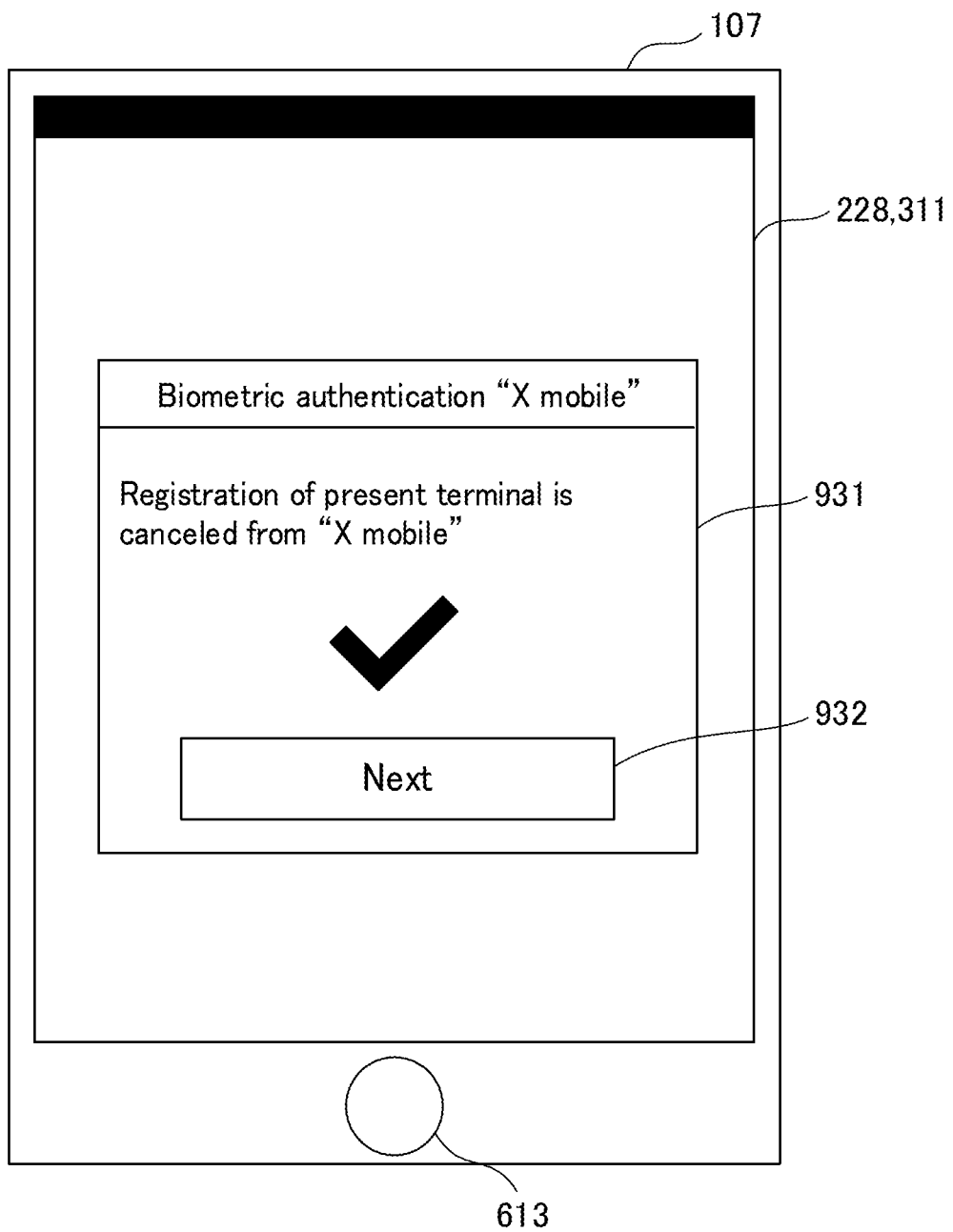

INFORMATION PROCESSING APPARATUS, CONTROL METHOD, AND STORAGE MEDIUM

BACKGROUND OF THE INVENTION

Field of the Invention

The present invention relates to a method of canceling registration information of a device such as a portable terminal, a PC, or a printer registered in a server.

Description of the Related Art

In recent years, fast identification online (FIDO) has attracted attention as a new authentication system including biometric authentication. When biometric information such as a fingerprint or vein pattern is used in biometric authentication, a case where information leaks to the outside becomes terminal because the information is not able to be rewritten unlike in conventional passwords for ID/password authentication.

On the other hand, in FIDO, registration processing is performed in advance between a terminal in the hand of a user and a server providing a web service. In the registration processing, a secret key associated with the biometric authentication of the user is stored in the terminal, and information such as authentication identification information associated with the biometric authentication or a public key which forms a pair with a secret key is registered in the server. In addition, authentication is performed on the device in the hand of the user rather than on a server through the Internet, and an authentication result signed with the secret key passes over the network. That is, since the biometric information does not pass through a network, the risk of leakage of the information is low.

A system may manage equipment by registering information of the equipment such as a PC or a printer in a management device (server) in advance. In such a system, similarly to FIDO, an authentication is often performed using a secret key and a public key created at the time of registration. In addition, in order to manage the equipment information, the management device may acquire the information from the equipment, or when an event occurs in the equipment, the equipment information may be transmitted to the management device.

In a system with such a configuration, when the equipment is outside the management of the server at a time of disposal, replacement, or the like, for example, a management user needs to cancel the registration of target equipment in the server. However, in a case where there are many pieces of equipment to be discarded, a case where pieces of equipment are spread out, or the like, performing the registration cancelation processing after confirming that the target equipment to be disposed of matches actual equipment requires time for this confirmation work and omissions in the confirmation are likely to occur.

Japanese Patent Laid-Open No. 2005-275616 discloses an asset management system in which an asset management server attempts to periodically acquire information on asset equipment registered in the asset management server itself under a network environment and in a case where the asset management server determines that the equipment information is not able to be acquired, the asset management server causes a user to perform confirmation for disposal of target equipment.

In a system that uses a web service by registering the information associated with the authentication information of a user, the equipment information, or the like in a server, such as FIDO, in a case where the terminal is discarded, or the like, it is preferable to cancel the registration of the terminal in the server. This is not only because registration information unnecessary for an account provided by the service would continue to remain but also there are cases where there is an upper limit on the number of terminals that are able to be registered in one account.

However, when performing the cancelation processing, since there is a possibility that a user of a terminal may have forgotten which service had been registered with or a user may not have been conscious of using an authentication system such as FIDO in the first place, it may be difficult to reliably cancel a registration.

In Japanese Patent Laid-Open No. 2005-275616, since the management device periodically acquires information of equipment in order to prompt the user to perform confirmation for disposal, a connection form of a network such as constant connection between equipment and a management device using a WAN, a LAN, or the like, is assumed. However, in a case of an authentication system such as FIDO, since there are many uses for smartphones, PCs, or the like for an individual, and the power may be turned off and there may often be an offline state, there is no limitation to an authentication system necessarily having a constant connection.

In addition, in a case of a smartphone or a PC, the smartphone or the PC communicates with a web server through a web browser or a native application, but due to the properties of a platform, there may be applications in which it is difficult to always activate the application and communicate constantly with the server.

SUMMARY OF THE INVENTION

The present invention provides an information processing apparatus capable of reliably canceling registration information of an information processing apparatus registered in an external server at the time of initialization of the information processing apparatus while reducing a burden on a user.

An information processing apparatus of an exemplary embodiment of the present invention includes an authentication module for biometric authentication using biometric information read by a biometric information sensor and a storage unit configured to have tamper resistance for storing the biometric information of a user necessary when performing authentication processing with the authentication module and a secret key generated for the biometric information. The information processing apparatus comprising a memory storing instructions and a processor executing the instructions causing the information processing apparatus to: transmit a request for a registration cancelation using information of a request destination for the registration cancelation of the registration information to an external server in which the registration information including a public key which is a pair with the secret key is registered, at the time of initialization of an OS of the information processing apparatus, wherein, when an authentication request for the registration cancelation is received from the server, a signature is generated using the secret key extracted according to an authentication success in the biometric authentication of the authentication module using the biometric information read by the biometric information sensor, and wherein, when the signature is successfully verified by being transmitted to the server, the registration cancelation of the registration information is performed in the server.

Further features of the present invention will become apparent from the following description of exemplary embodiments (with reference to the attached drawings).

BRIEF DESCRIPTION OF THE DRAWINGS

FIGS. 2A and 2B are diagrams illustrating a hardware configuration example of a server, a PC, and a portable terminal.

FIGS. 3A and 3B are diagrams illustrating a software configuration example of the portable terminal and the PC.

FIG. 4 is a diagram illustrating a sequence of processing of registering an authenticator in the server.

FIGS. 9A to 9C are diagrams illustrating an example of a screen transition when initialization is performed in the portable terminal.

DESCRIPTION OF THE EMBODIMENTS

Hereinafter, an exemplary embodiment for implementing the present invention will be described with reference to the drawings and the like.

In addition, the present invention relates to a mechanism in which a web service performs biometric authentication of a terminal possessed by a user in order to authenticate the user and the service authenticates the user based on a result of the authentication. This may be realized by registering information associated with the biometric authentication in the terminal possessed by the user in the service on the web, for example, authentication identification information, a public key, and the like in advance. Although FIDO is described as an example of such a mechanism, it should be noted in advance that the present invention is not limited to the FIDO.

First Exemplary Embodiment

Figure 1:
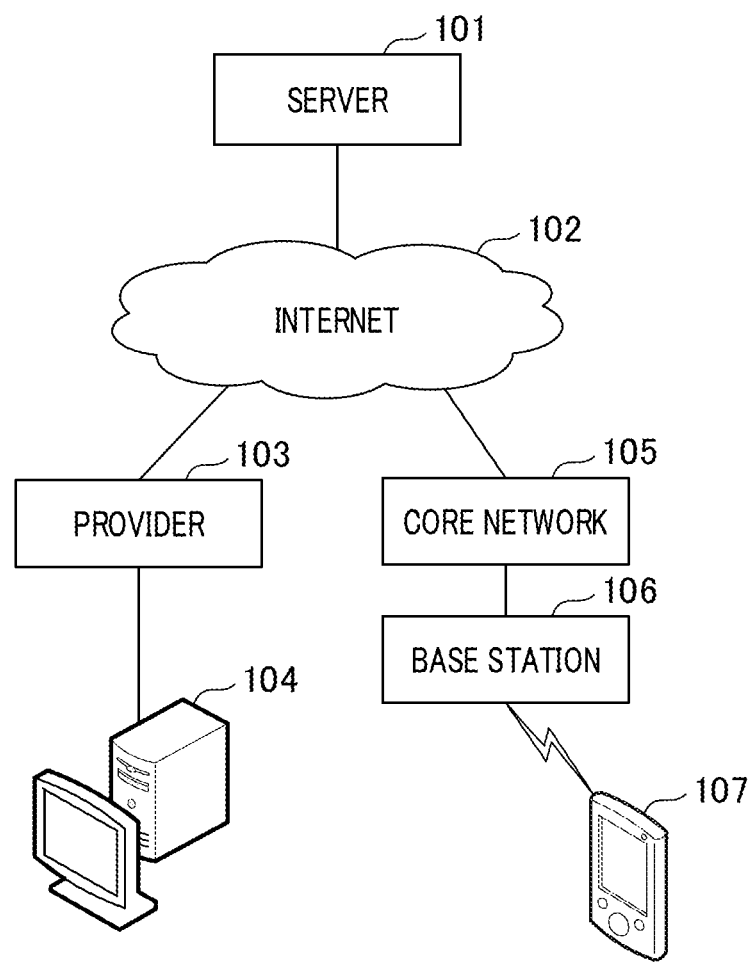
FIG. 1 is a diagram illustrating a network configuration of a system.

FIG. 1 is a diagram illustrating a network configuration example of the present system.

An information processing apparatus 104 is an information processing apparatus such as a personal computer (PC), a printer, or a multifunction printer that communicates with a provider 103 through an optical line and is connected to the Internet 102 through the provider 103. In the present exemplary embodiment, the information processing apparatus 104 will be described as a PC 104.

An information processing apparatus 107 is a terminal that wirelessly communicates with a base station 106 and is connected to the Internet 102 through a core network 105, for example, a tablet PC, a smart phone, a notebook PC, or the like. The information processing apparatus 107 may be a desktop PC, a printer, or the like having a wireless communication function. In the present embodiment, the information processing apparatus 107 will be described as a mobile terminal 107.

A server 101 is a system that provides web content or a web API to each information processing apparatus through the Internet 102. In addition, hereinafter, a client device for the server 101 such as the PC 104 or the portable terminal 107 is simply referred to as a device.

FIG. 2A is a diagram illustrating a hardware configuration example of the server 101 and the PC 104.

A CPU 201 executes a program stored in a ROM 203 and a storage device 210 using a RAM 202 as a work memory and controls respective components described later through an internal bus 211. A keyboard controller 204 controls an operation input from a keyboard 208 or a pointing device (a mouse, a touch pad, a touch panel, a track ball, or the like) that is not shown.

A display controller 205 controls a display of a display 209. A disk controller 206 controls a data access to the storage device 210 such as a hard disk (HD) and a flexible disk (FD) that stores various pieces of data. A network interface 207 is connected to a network such as a LAN and controls communication with other equipment connected to the network. Each of units 201 to 207 configuring hardware is connected through the internal bus 211.

FIG. 2B is a diagram illustrating a hardware configuration example of the portable terminal 107.

The portable terminal 107 in FIG. 2B further includes a wireless communication function in addition to basic hardware configuring the server 101 or the PC 104. A CPU 221, a RAM 222, and a ROM 223 have the same functions as those of the CPU 201, the RAM 202, and the ROM 203 in FIG. 2A.

A storage device 224 is a storage device such as a solid state drive (SSD) or an SD memory card, and stores various pieces of data similarly to the storage device 210. A network interface 225 has a wireless communication function in addition to controlling communication with other equipment connected to the network.

A trusted platform module (TPM) 226 is a storage unit configured to have tamper resistance for preventing stored data from being read from the outside for the purpose of processing or storing confidential information. The TPM 226 has a function of storing biometric information input by a biometric information sensor 227 and a secret key generated in the portable terminal 107 and verifying the stored biometric information and the input biometric information. In addition, the PC 104 may also include the TPM 226.

The biometric information sensor 227 is a sensor that reads biometric information such as a fingerprint, a vein pattern, and a face of a user. A touch panel 228 is a device having both a display function and a pointing function and the user is able to perform an operation on an object displayed on the display with a finger, a touch pen, or the like. In addition, the touch panel 228 may be a touch panel in which a part or the entire surface is a biometric information sensor such as for a fingerprint or a vein, and in this case, the touch panel 228 is provided with the biometric information sensor 227.

FIG. 3A is a diagram illustrating a software configuration example of the PC 104 and the portable terminal 107.

Hereinafter, description will be given based on the hardware configuration of the portable terminal 107, but the same applies to the PC 104. A cooperation application 310 and an initialization application 320 are realized by the CPU 221 reading and outputting a program stored in the ROM 223 to the RAM 222.

The cooperation application 310 provides the authentication function or a service of the server 101 to the user in cooperation with the server 101. The cooperation application 310 is a native application or a web browser installed in the portable terminal 107. A display unit 311 is a software module for providing a UI to the user through the touch panel 228. A communication unit 312 is a software module for communicating with external equipment such as the server 101 through the network interface 225.

An authenticator registration control unit 313 is a software module that performs a request for creation of a credential which will be described later with respect to an authenticator 330. In addition, in the present exemplary embodiment, the authenticator registration control unit 313 is included in the cooperation application 310, but is not limited thereto. For example, the authenticator registration control unit 313 may be configured independently from the cooperation application 310, and the cooperation application 310 may call the independent authenticator registration control unit 313.

In addition, the authenticator registration control unit 313 may be installed in the OS in a standard manner. Not only the cooperation application 310 but also another application is able to call the authenticator registration control unit 313 by configuring the authenticator registration control unit 313 independently from the application as described above.

An authenticator authentication control unit 314 requests the authenticator 330 of authentication processing or generates a request for a transmission to the server 101 at the time of the authentication. A specific processing flow performed by the authenticator authentication control unit 314 will be described later. In addition, similarly to the authenticator registration control unit 313, the authenticator authentication control unit 314 may also be configured independently from the cooperation application 310.

An initialization application 320 is an application for initializing data in the portable terminal 107 at an OS level. The initialization at the OS level means that an application installed by the user, data related to the application, basic setting information of the OS, and the like are deleted by the initialization. In addition, due to the initialization, the biometric information stored in the TPM 226, the secret key generated in the portable terminal 107, and the like are also deleted.

In the present exemplary embodiment, it is assumed that the initialization application 320 is standardly mounted on the OS, but as long as an application installed by the user has the same function as the initialization application, it is possible to replace the initialization application 320 with an application installed by the user.

The display unit 321 receives an initialization request from the user and provides a UI for performing an operation related to the initialization to the user. An initialization unit 322 executes initialization processing of the portable terminal 107. An authenticator authentication information acquisition unit 323 acquires the various pieces of data stored in the TPM 226. Details of the authenticator authentication information acquisition unit 323 will be described.

The authenticator 330 is an authentication module for the biometric authentication using the biometric information read by the biometric information sensor 227. An authenticator registration processing unit 331 is a software module that receives a creation request of the credential from the authenticator registration control unit 313 of the cooperation application 310, and performs creation of a pair key (the secret key and the public key) or a creation of a credential.

A biometric authentication processing unit 332 is a software module that receives the biometric authentication request from the authenticator authentication control unit 314 or the like of the cooperation application 310 and performs the biometric authentication using the biometric information read by the biometric information sensor 227. An authentication information storage unit 333 is a software module that stores the authentication information and the like in the TPM 226. The authentication information is, for example, information shown in Table A or Table B which will be described later. A biometric information request unit 334 is a software module that provides a UI for receiving an input of the biometric information to the user through the touch panel 228.

<Example of Table on Side of Portable Terminal 107>

Hereinafter, the various pieces of data stored in the TPM 226 by the portable terminal 107 will be described using Table A and Table B. In detail, table data shown in Table A and Table B is data stored in the TPM 226 by the authentication information storage unit 333 of the authenticator 330 included in the portable terminal 107.

TABLE A

Authentication information management table

| Authentication information ID | Service ID | User ID | Secret key | Biometric information ID |
|---|---|---|---|---|
| 407c-8841-79d | x-mobile.com | user001 | 1faea2da-a269-4fa7-812a-509470d9a0cb | d4931744 |
| 4c04-428b-a7a2 | y-bank.com | user002 | d7ae30c8-3775-4706-8597-aaf681bc30f5 | dcc97daa |
| 92b2-498d-bea6 | z-market.com | user003 | 36ae5eed-732b-4b05-aa7b-4dddb4be3267 | 51caacaa |
| . . . | . . . | . . . | . . . | . . . |

In the authentication information management table of Table A, one record indicates one entry of the authentication information. A record of Table A is created and added to Table A when the authenticator 330 is registered in the service. An ID for uniquely identifying each piece of authentication information is stored in an authentication information ID column. In a service ID column, an ID for uniquely identifying the service of the server 101, which will be described later, is stored. In the present exemplary embodiment, a domain name of a service 340 is used as the service ID.

In a user ID column, an ID for uniquely identifying the user by the service 340 used by legacy identification is stored. In a secret key column, the secret key among the created pair of keys is stored. The public key corresponding to (paired with) the secret key is registered in the service indicated in the column of the service ID. In a biometric information ID column, an ID corresponding to a feature amount of the biometric information is stored. A procedure of storing the information corresponding in each column of the authentication information management table and a procedure of storing the public key in the service 340 will be described later.

of the authenticator 330 is stored. When the registration cancelation is requested, the cooperation application 310 transmits the request to the registration cancelation URL. When the authenticator 330 is registered in the service 340, the registration cancelation URL is transferred from the service 340 through the cooperation application 310. In addition, the registration cancelation URL is transferred as a response from the service 340 and may not be supported by the service 340 in some cases. Therefore, the registration cancelation URL may not be present (null) in some cases as shown in second row of Table B.

In addition, Table B is an example of an API management table, and may store data different from that in the above-described columns may be stored therein. For example, the API management table may be extended in consideration of

TABLE B

API management table

| Authentication information ID | Service ID | Application ID | Registration release URL |
|---|---|---|---|
| 407c-8841-79d | x-mobile.com | x-mobile | https://cstinfo.x-mobile.com/fido/deregister/user001 |
| 4c04-428b-a7a2 | y-bank.com | y-bank | null |
| 92b2-498d-bea6 | z-market.com | web | https://www.z-market.com/authenticator/delete/user003 |
| ... | ... | ... | ... |

The API management table of Table B is a table used when the registration cancelation of the authenticator 330 is requested to the service 340. In addition, the API management table may be one table combined with the Table A. In the API management table, one record indicates an entry of an API for the registration cancelation for each service for each piece of the authentication information. Similarly to Table A, the record of Table B is created and added to Table B when the authenticator 330 is registered in the service.

Each of columns of the authentication information ID and the service ID are the same as each of the columns of Table A. In an application ID column, the application ID (hereinafter, referred to as the application ID) uniquely specifying the cooperation application 310 used when the authenticator 330 is registered in the service 340 is stored. The application ID is transferred when the authenticator registration control unit 313 of the cooperation application 310 performs a creation request of a credential to the authenticator 330, which will be described later.

The application ID is a unique value for each application in the portable terminal 107, and is used for activating an application corresponding to the application ID from another application installed in the portable terminal 107. As a technique for activating another application from an application using an ID for identifying an application such as the application ID, there are a URL scheme, an intent, and the like.

In addition, when the other application is activated from the application using the application ID, it is also possible to activate the other application using a parameter. In addition, in a case where the cooperation application 310 is a native application, the application ID of the native application is stored as the application ID as shown in first and second rows of Table B. In addition, in a case where the cooperation application 310 is a web browser, the application ID of the web browser is stored as the application ID as shown in third row of Table B.

In a registration cancelation URL column, a request destination (URL) for requesting the registration cancelation a case where it is desired to have an URL parameter in the registration cancelation URL, or the like.

FIG. 3B is a diagram illustrating a configuration example of software of the server 101.

The service 340 is a web service and is realized by the CPU 201 reading a program stored in the ROM 203 to the RAM 202 and executing the program. In addition, in the present exemplary embodiment, an authentication for verifying matching of a user ID with a password is described as legacy authentication in order to distinguish the authentication for verifying the match of the user ID and the password from the biometric authentication.

A legacy authentication processing unit 341 is a software module that verifies whether a user ID and a password included in a legacy authentication request received by a communication unit 343 match a user ID and a password stored in a user information storage unit 344.

An authenticator information processing unit 342 is a software module that stores information on the authenticator 330 in an authenticator information storage unit 345 using a credential received by the communication unit 343. In addition, the authenticator information processing unit 342 verifies assertion information (assertion) received by the communication unit 343, which will be described later.

The communication unit 343 is a software module for communicating with external equipment such as the portable terminal 107 through the network interface 207. For example, the communication unit 343 receives various requests from the portable terminal 107. The user information storage unit 344 is a software module that stores user information, which will be described later using Table C, in the storage device 210 or an external storage system (not shown).

An authenticator information storage unit 345 is a software module that stores information on the authenticator 330 (authenticator information), which will be described later using Table E, in the storage device 210 or an external storage system (not shown). An extension request processing unit 346 is a software module for receiving a request of the registration cancelation transmitted from the portable terminal 107 and processing the request. Details of a time at which the request is received and details of the processing will be described later.

A presentation unit 347 is a software module that generates HTML, CSS, or JavaScript (registered trademark) according to an acquisition request of various screens for the registration, the cancelation, and the like of the authenticator received by the communication unit 343. A token management unit 348 is a software module that issues or verifies a token which will be described later.

<Example of Table on Side of Server 101>

Hereinafter, various pieces of data stored by the server 101 will be described using Tables C to F. In detail, table data shown in Tables C to F is data stored in the storage device 210 or an external storage system (not shown) by each software module of the service 340 included in the server 101.

TABLE C

User information management table

| User ID | Password | Mail address |
|---|---|---|
| user001 | ****** | user001@xxx.co.jp |
| user102 | ****** | user002@xxx.co.jp |
| ... | ... | ... |

The user information management table of Table C is data managed by the user information storage unit 344 of the service 340. In the user information management table, one record indicates one piece of the user information. In a user ID column, an ID for uniquely identifying the user of the service 340 is stored. In a password column, a password for authenticating the user is stored. In a mail address column, a mail address of the user is stored. In addition, in the user information management table, as the user information, in addition to the mail address, attribute information on the user, such as an address of the user may be stored.

TABLE D

Attestation challenge management table

| Attestation challenge | User ID | Expiration date |
|---|---|---|
| 65C9B063-9C33 | user001 | 2017-05-02T12:00:34Z |
| 7317EFBA-4E63 | user201 | 2017-05-02T12:03:12Z |
| ... | | |

The attestation challenge management table of Table D is data managed by the user information storage unit 344 of the service 340. In the attestation challenge management table, one record indicates information on one attestation challenge. An attestation challenge is a parameter used as verification data for a challenge response authentication and is issued for each user.

Issue processing of the attestation challenge will be described later. In an attestation challenge column, a value of the attestation challenge is stored. In a user ID column, a user ID of the user issuing the attestation challenge is stored. In an expiration date column, an expiration date of the attestation challenge is stored.

TABLE E

Authenticator information management table

| Authenticaten information ID | Device name | Public key | User ID |
|---|---|---|---|
| 407c-8841-79d | user001_no_tablet | AC43C5FB-BFA2-48D1-A71B-FB04ACDA347A | user001 |
| abcd-1234-5678 | user301_no_phone | 8143CA9F-35C9-4333-948F-BFCE66A74310 | user301 |
| ... | ... | ... | ... |

The authenticator information management table of Table E is data managed by the authenticator information storage unit 345 of the service 340. In the authenticator information management table, one record indicates one piece of the authenticator information. In a case where the authenticator 330 is registered, a record is added to the information management table of the authenticator. In an authentication information ID column, the value of the authentication information ID column of the authentication information managed by the registered authenticator 330 in the authentication information management table (Table A) is stored.

In a device name column, a name of the device on which the authenticator 330 is mounted is stored. The device name is an attribute that may be set by the user. In a public key column, the public key corresponding to (paired with) the secret key created by the authenticator 330 and managed in the authentication information management table (Table A) is stored.

That is, data encrypted by the secret key of Table A may be decrypted by the public key of Table E, by the secret key and the public key of which values are the same as those of the authentication ID in the authentication information management table (Table A) and the authenticator information management table (Table E). In a user ID column, an ID for uniquely identifying the user by the service 340 is stored.

TABLE F

Token management table

| Token | User ID | Expiration date |
|---|---|---|
| 3FD4FA-AA4-56DC-B45F-45BCD65AC45D | user001 | 2017-05-02T13:14:31Z |
| EC51DC-36C4-4BC3-54CF-31ECE6CACBF0 | user401 | 2017-05-02T13:31:32Z |
| ... | ... | ... |

The token management table of Table F is data managed by the user information storage unit 344 of the service 340. In the present exemplary embodiment, the token is issued by the service 340 as a result of a success of a series of the authentication processing using the biometric information which will be described later. When the service 340 is used, the cooperation application 310 may use the service provided by the service 340 by giving the issued token to transmit the request.

In the token management table, one record indicates information on one token. In a token column, the token is stored. In a user ID column, an ID for uniquely identifying the user by the service 340 is stored. In an expiration date column, an expiration date of the token is stored. In a case where the token assigned to the request from the user is present in the token column of the token management table and has not passed the expiration date of the expiration date column, the service 340 receives the request.

Next, processing of registering the authenticator 330 of the device in the service 340 of the server 101 will be described using FIGS. 4 to 6.

Hereinafter, a case where the device is the portable terminal 107 will be described, but the same is applied to even a case where the device is the PC 104. In addition, registering the information of the authenticator 330 in the service 340 is simply referred to as a registration of the authenticator.

FIG. 4 is a diagram illustrating a sequence of processing of registering the authenticator 330 in the service 340.

First, in S401, the registration screen is requested from the cooperation application 310 of the portable terminal 107 to the service 340 of the server 101. In addition, the registration screen is a file such as HTML or JavaScript in a case where the cooperation application 310 is the web browser and is data for displaying a screen required for the registration on the device.

The registration screen may include various programs or data. In S402, the service 340 returns a screen for performing the legacy authentication in response to the request in S401. In S403, the cooperation application 310 displays the legacy authentication screen through the display unit 311 and receives the ID/password from the user. In addition, the cooperation application 310 transmits the ID/password received from the user through the display unit 311 to the service 340.

In S404, the legacy authentication processing unit 341 of the service 340 performs the verification of the received ID/password. In a case where a result of the legacy authentication corresponds to an error, the legacy authentication processing unit 341 returns an authentication error to the cooperation application 310. In addition, in FIG. 4, it is assumed that the legacy authentication has succeeded. In S405, the token management unit 348 of the service 340 issues the token, and the user information storage unit 344 manages the information on the token in the token management table (Table F).

In S406, the authenticator information processing unit 342 creates a registration parameter. The registration parameter is data used when the server 101 executes the registration processing of the authenticator 330. The authenticator 330 receives the registration parameter through the cooperation application and creates the credential using the data included in the registration parameter. In addition, the server 101 receives the credential through the cooperation application 310 and the server 101 verifies that the registration request from the cooperation application 310 is not an illegal request based on the credential. Hereinafter, the registration parameter will be described.

Figure 5A:
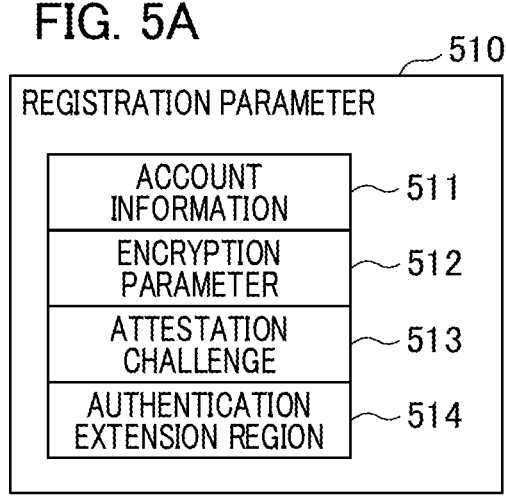
FIGS. 5A to 5C are diagrams illustrating an example of parameters used at the time of registration of the authenticator.
Figure 5B:
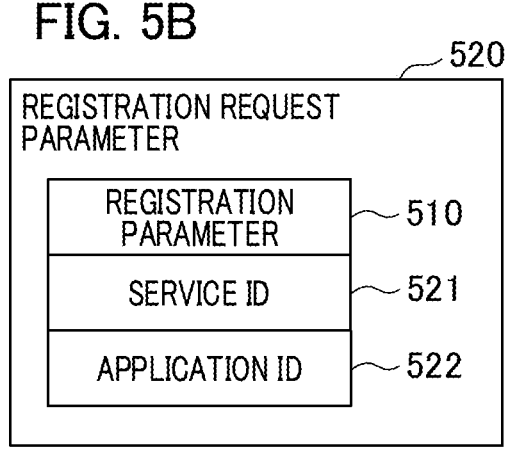
Figure 5C:
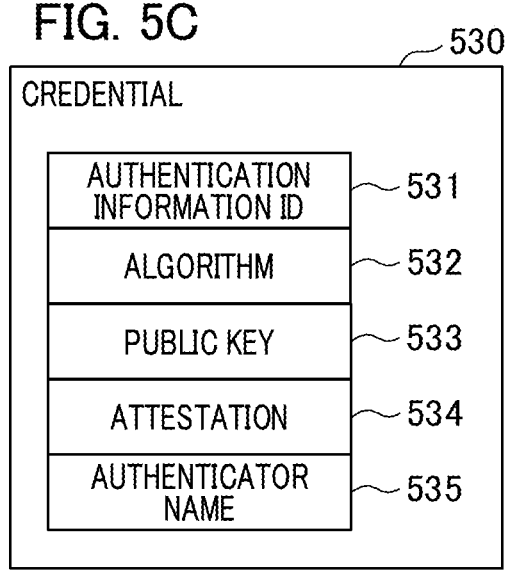

FIGS. 5A to 5C are diagrams illustrating an example of the parameter included in the communication between the portable terminal 107 and the server 101 in the registration of the authenticator 330.

Here, the registration parameter will be described using FIG. 5A. A registration parameter 510 includes account information 511, an encryption parameter 512, an attestation challenge 513, and an authentication extension region 514.

In the account information 511, attribute information on the user such as the user ID specified by the legacy authentication of S404 and a mail address associated with the user ID in the service 340 is stored. In the encryption parameter 512, attribute information on the authentication information to be registered, such as an encryption algorithm supported by the service 340, is stored. In the attestation challenge 513, the verification data used for performing the challenge response authentication is stored.

The verification data, that is, the attestation challenge 513 is created when the registration parameter is created in S406 and is stored in the attestation challenge management table (Table D) in association with the user ID, the expiration date, and the like. In the authentication extension region 514, an extension parameter that is able to be designated by the service 340 and used for controlling an operation of the authenticator 330 or the like by the service 340 is stored. In the present exemplary embodiment, the registration cancellation URL shown in Table B is stored in the authentication extension region 514 as the extension parameter.

Description will return to the description of FIG. 4. In S407, the communication unit 312 of the service 340 returns the registration screen of the authenticator created by the presentation unit 347 to the cooperation application 310. In the data returned in S407, in addition to the various programs or data for displaying the registration screen, the token issued in S405 and the registration parameter 510 created in S406 are included.

In S408, the authenticator registration control unit 313 of the cooperation application 310 performs the creation request of the credential on the authenticator 330. The creation request is executed when the display unit 311 of the cooperation application 310 reads the registration screen of the authenticator 330. For example, processing of S408 is executed in an onload event that occurs when the registration screen of the authenticator 330 is read. The creation request of the credential includes the registration request parameter. Hereinafter, the registration request parameter will be described.

FIG. 5B is a diagram illustrating an example of the registration request parameter 520.

The registration request parameter 520 includes a registration parameter 510, a service ID 521, and an application ID 522. The registration parameter 510 is the registration parameter 510 received from the service 340 in S407.

The service ID 521 is an ID for uniquely identifying the service 340 to be registered by the authenticator as described in Table A or B. The application ID 522 is an ID for uniquely specifying the cooperation application 310 used when the authenticator 330 is registered in the service 340 as described in Table B. In addition, the application ID is created by the cooperation application 310.

The description is returned to the description of FIG. 4. In S409, the biometric information request unit 334 of the authenticator 330 displays a screen for requesting an input of the biometric information used in the biometric authentication to the user. Hereinafter, the screen displayed in S409 will be described.

Figure 6:
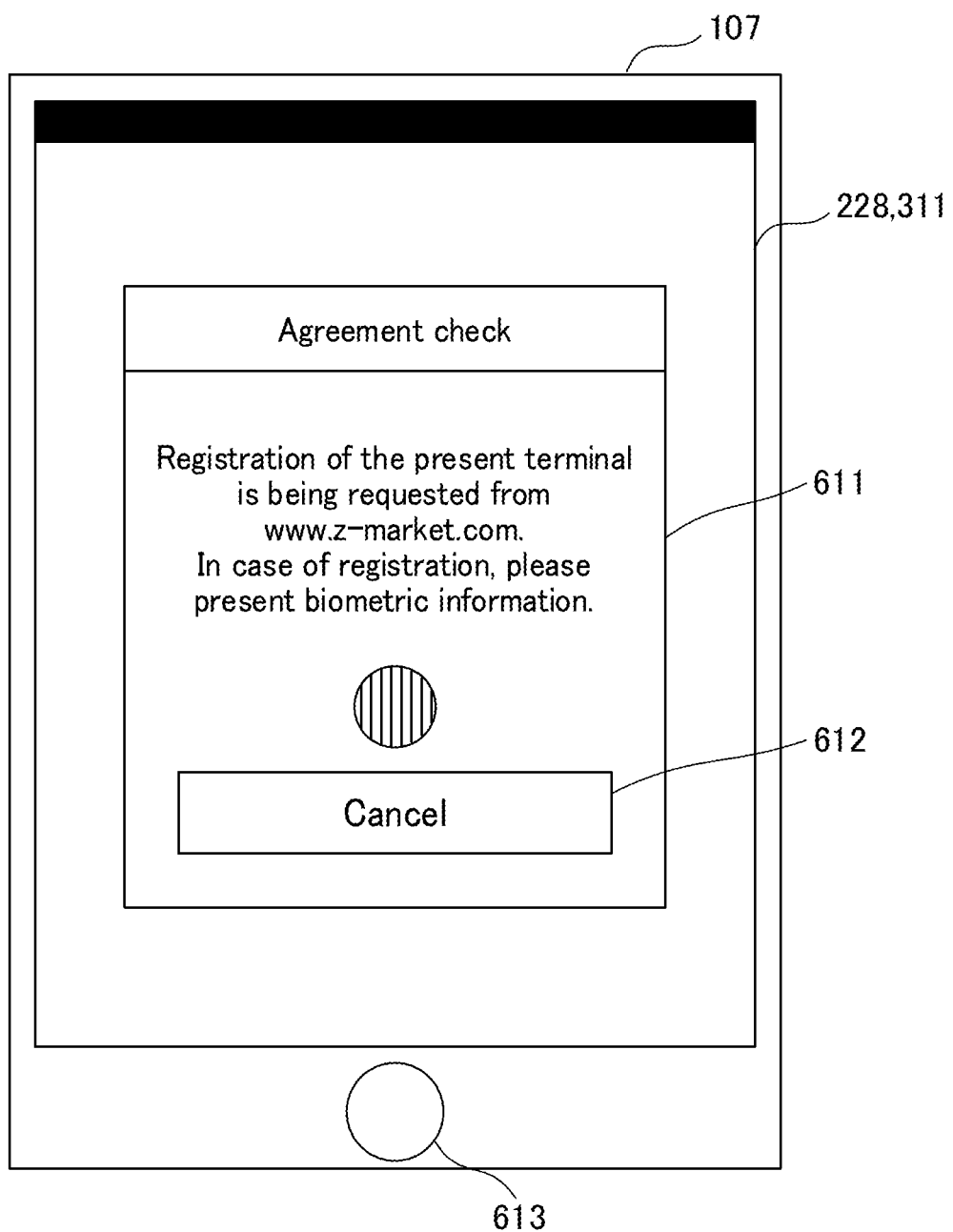
FIG. 6 is a diagram illustrating an example of a screen displayed at the time of the registration of the authenticator.

FIG. 6 is a diagram illustrating an example of a screen displayed on the display unit 311 of the cooperation application 310 during the registration of the authenticator 330. In an agreement screen 611, in order to register the authenticator 330 in the service 340, a user who is operating the portable terminal 107 is prompted to input biometric information. A button 612 is a button for the user who does not agree with the input of the biometric information and for canceling the registration to the service 340.

A button 613 is a button for reading the biometric information such as a fingerprint and includes the biometric information sensor 227. In addition, as the biometric information, a vein, an iris, a voice print, a face image, and the like may be used, and the biometric information is not limited to one of those. Here, the portable terminal 107 is configured to input any one piece of the biometric information or a combination of an arbitrary plurality of pieces of biometric information as the biometric information used in the biometric authentication.

The description is returned to the description of FIG. 4. In S410, the authenticator registration processing unit 331 creates the biometric information ID for uniquely identifying the feature amount of the read biometric information and the biometric information. In S411, the authenticator registration processing unit 331 creates a pair of the public key and the secret key. In addition, the authenticator registration processing unit 331 stores the following information in the authentication information management table (Table A) stored in the TPM 226 with respect to the authentication information storage unit 333.

That is, the biometric information ID created in S410 and the secret key among the key pair created in S411 are stored as the authentication information in association with the service ID and the user ID of the registration request parameter 520 included in the creation request of the credential. In addition, in the stored authentication information, an ID for uniquely identifying each piece of the authentication information is created and stored in the authentication information management table (Table A).

In addition, the authenticator registration processing unit 331 stores the authentication information ID, the service ID, the application ID, and the registration cancelation URL in the API management table (Table B). Similarly to the service ID, the application ID and the registration cancelation URL are also included in the registration request parameter 520. In S412, the authenticator registration processing unit 331 creates the credential. Hereinafter, the credential will be described.

FIG. 5C is a diagram illustrating an example of the credential.

The credential 530 includes an authentication information ID 531, an algorithm 532, a public key 533, an attestation 534, and an authenticator name 535. The authentication information ID 531 is the authentication information ID stored in the authentication information management table (Table A) in S411, and the public key 533 is the public key of the key pair created in S411.

The algorithm 532 stores the algorithm used when the key pair is created in S411. In addition, the attestation 534 is data obtained by encrypting the attestation challenge 513 of the registration request parameter included in the creation request of the credential using the secret key created in S411. The authenticator name 535 is a name of the authenticator 330 and is created by the authenticator 330.

In S413, the authenticator registration processing unit 331 returns the credential 530 created in S412 to the cooperation application 310. In S414, the communication unit 312 of the cooperation application 310 transmits the credential 530 received in S413 to the service 340.

In S415, the authenticator information processing unit 342 of the service 340 performs the authentication processing of the authenticator using the received credential 530. Hereinafter, registration processing of the credential executed by the authenticator information processing unit 342 will be described.

The authenticator information processing unit 342 decrypts the attestation 534 included in the credential 530 by the public key 533 included in the same credential 530 and verifies that the request is not an illegal registration request. In addition, in the attestation challenge management table (Table D), the authenticator information processing unit 342 specifies a value the same as a value obtained by decrypting the attestation 534 by the public key 533 as the record in the attestation challenge column.

In addition, the authenticator information processing unit 342 sets the user ID of the specified record as a user ID associated with the credential 530. In addition, the authenticator information processing unit 342 stores (registers) the authentication information ID 531 and the public key 533 included in the credential 530 and the user ID associated with the credential 530 in the authentication information management table (Table E). Finally, the communication unit 343 of the service 340 notifies the cooperation application 310 that the registration processing of the authenticator 330 has been completed normally.

Next, processing of performing the registration cancelation of the authenticator 330 of the device in the server 101 when initialization of the device is performed will be described using FIGS. 7 to 9C.

Hereinafter, a case where the device is the portable terminal 107 will be described, but the same is applied to a case where the device is the PC 104. In addition, in the server 101, in a case where the registration cancelation of the authenticator is performed, the information on the authenticator 330 registered in the service 340 is deleted.

Figure 7:
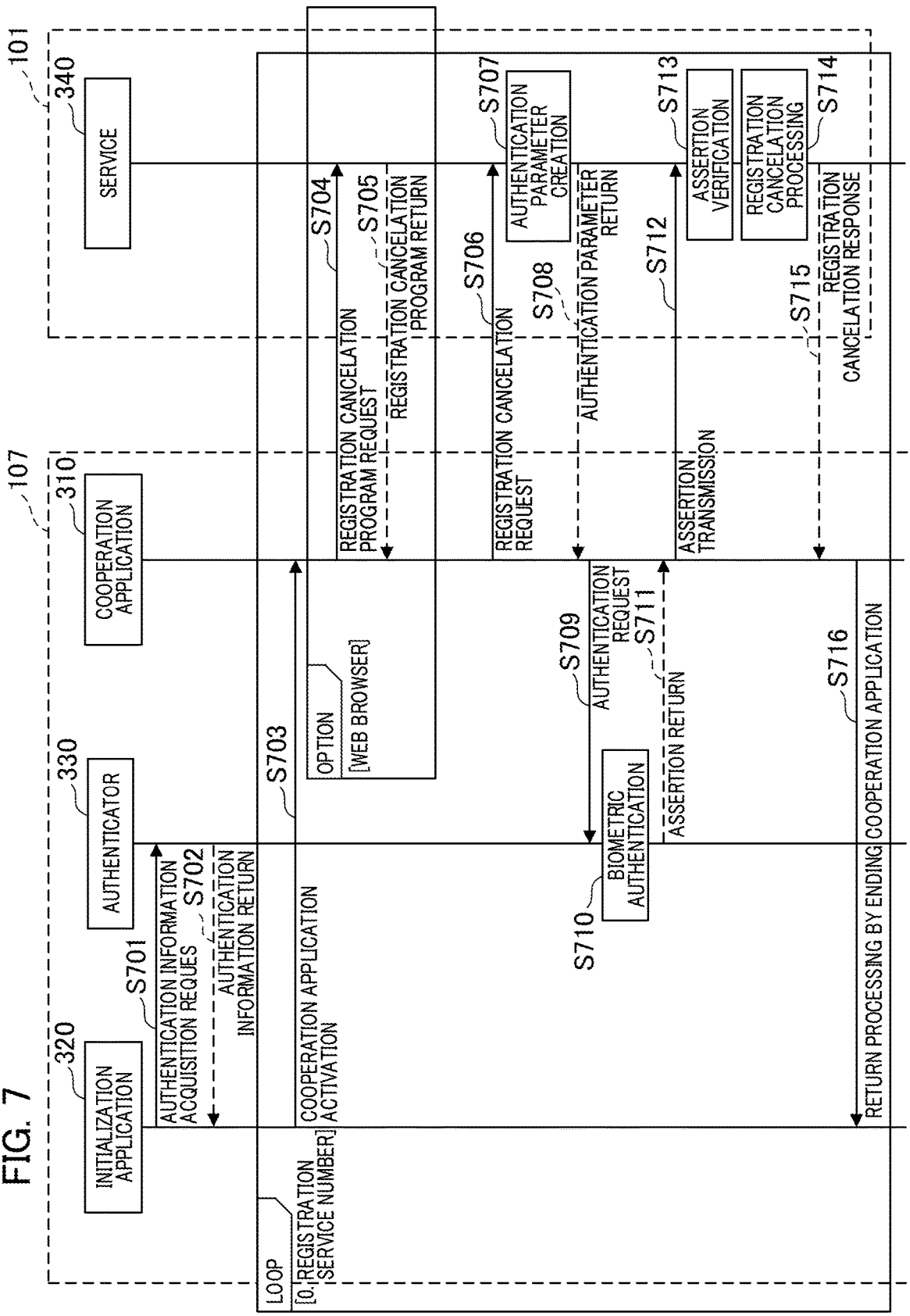
FIG. 7 is a diagram illustrating a sequence of processing of performing the registration cancelation of the authenticator.

FIG. 7 is a diagram illustrating a sequence of the processing of performing the registration cancelation of the authenticator 330 of the portable terminal 107 registered in the service 340 when the initialization of the portable terminal 107 is performed. In the present exemplary embodiment, in a case where the initialization of the portable terminal 107 is performed, the registration of the authenticator 330 registered in the service 340 of the server 101 is canceled.

In the present exemplary embodiment, when the registration is canceled, the cancelation processing is executed using the cooperation application 310 of the portable terminal 107 itself used in the registration. In addition, in order to cancel the registration in the service 340, the authentication of the cooperation application 310 is performed for each service 340. In addition, in the portable terminal 107, initialization of all data is performed, but in the sequence shown in FIG. 7, only a part is shown, and sequences before and after the part are omitted.

When the initialization is executed in the portable terminal 107, first, the initialization application 320 is executed in the portable terminal 107. Then, in S701, the authenticator authentication information acquisition unit 323 of the initialization application 320 performs the acquisition request of the authentication information on the authenticator 330. In S702, the authentication information storage unit 333 of the authenticator 330 acquires the data stored in the authentication information management table (Table A) and the API management table (Table B) and returns the data to the initialization application 320.

Figure 9A:
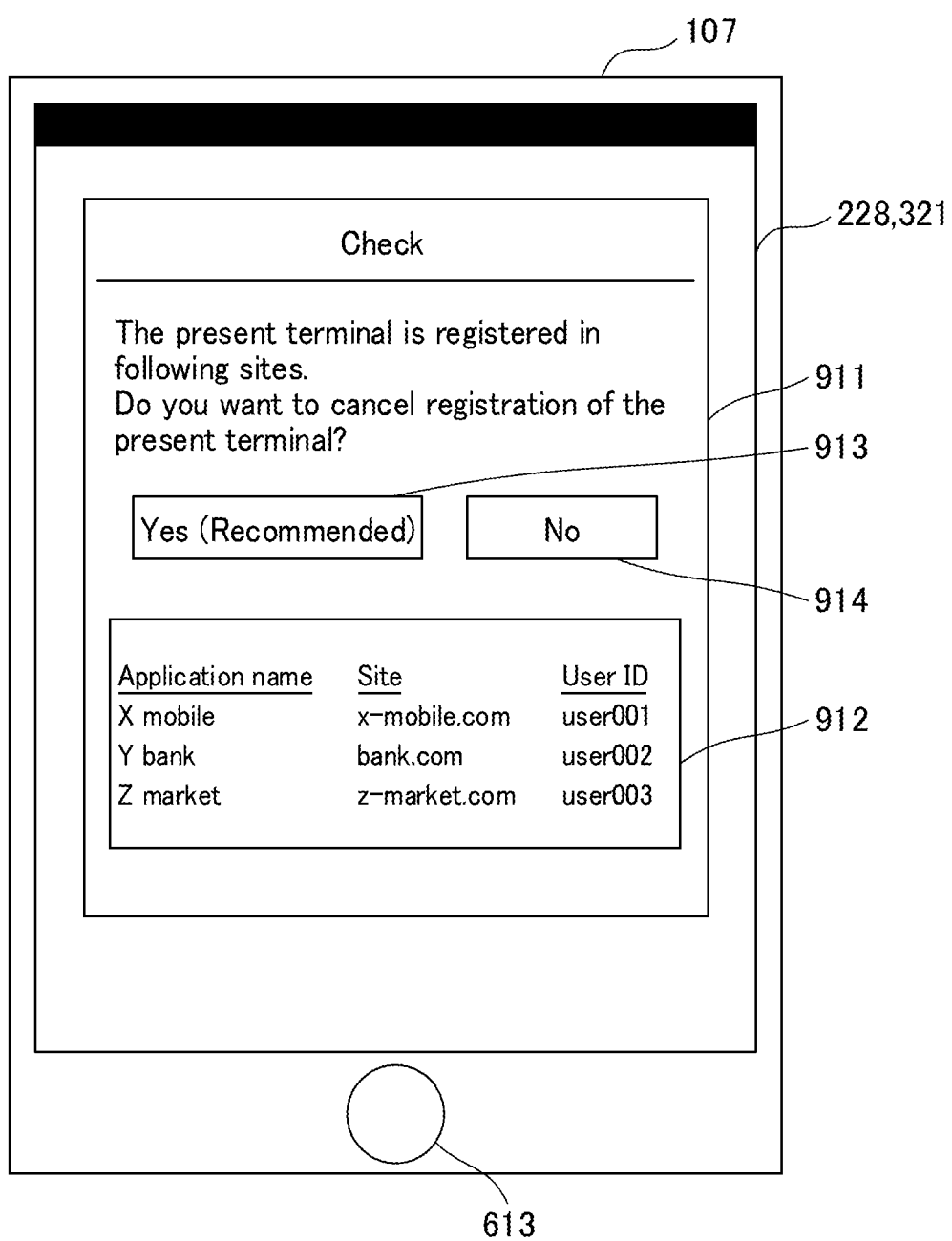

FIG. 9A is an example of a screen displayed by the initialization application 320 based on the data acquired in S702.

A screen 911 is a screen for checking whether the registration cancelation of the authenticator 330 is to be performed according to the initialization of the portable terminal 107.

A screen 912 displays a list of the services 340 in which the authenticator 330 is registered. In a case where a button 913 is pressed, the registration cancelation of the authenticator 330 is performed. In a case where a button 914 is pressed, the registration cancelation of the authenticator 330 is canceled. In addition, it is assumed that the button 913 is pressed in FIG. 9A.

The description is returned to the description of FIG. 7. Hereinafter, the registration cancelation processing shown in S703 to S716 is repeated for the number of records in which the registration cancelation URL is present in the API management table (Table B). First, in S703, the initialization application 320 activates the cooperation application 310 to perform the registration cancelation using the application ID of the API management table (Table B).

In addition, at this time, the initialization application 320 may transfer each piece of the data of the authentication information management table (Table A) and the API management table (Table B) received in S702 as the parameter to the cooperation application 310 as necessary.

In S706, the activated cooperation application 310 requests the registration cancelation with respect to the registration cancelation URL of the API management table (Table B). The extension request processing unit 346 of the service 340 of the server 101 receives and processes the request of the registration cancelation.

In addition, in a case where the cooperation application 310 is the web browser (the web application), the cooperation application 310 does not have a UI at a timing when the web browser is activated. Therefore, in S704 and S705, a program or data such as HTML or JavaScript for displaying a screen required in the registration cancelation on the portable terminal 107 is requested to the service 340 and is acquired from the service 340. Such an acquired program or data is referred to as a registration cancelation program.

In addition, on the other hand, in a case where the cooperation application 310 is a native application, the UI and the registration cancelation program installed in the portable terminal 107 in advance may be used, but the registration cancelation program may be acquired from the service 340 again.

In S706, the cooperation application 310 requests the registration cancelation to the registration cancelation URL of the service 340. In S707, the authenticator information processing unit 342 of the service 340 creates the authentication parameter. The authentication parameter is data used when the service 340 performs the authentication of the cooperation application 310. Hereinafter, the authentication parameter will be described.

Figure 8A:
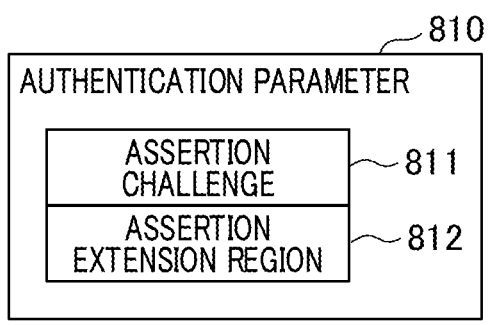
FIGS. 8A and 8B are diagrams illustrating an example of a parameter used at the time of an authentication related to the registration cancelation.
Figure 8B:
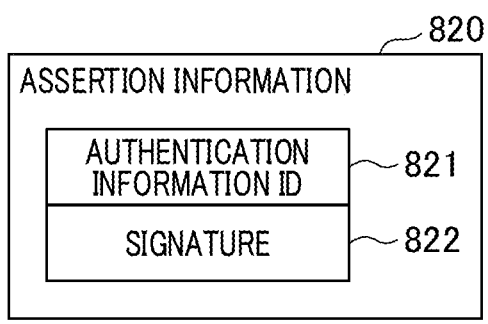

FIGS. 8A and 8B are diagrams illustrating an example of a parameter included in the communication between the portable terminal 107 and the server 101 in the registration cancelation of the authenticator 330.

Here, the authentication parameter is described using FIG. 8A. The authentication parameter 810 includes an assertion challenge 811 and an assertion extension region 812.

In the assertion challenge 811, verification data used for performing a challenge response authentication is stored. In the assertion extension region 812, an extension parameter that is able to be designated by the service 340 and used for controlling an operation of the authenticator 330 or the like by the service 340 is stored.

The description is returned to the description of FIG. 7. In S708, the communication unit 312 of the service 340 returns the authentication parameter 810 created in S707 by the authenticator information processing unit 342 to the cooperation application 310. In S709, the authenticator authentication control unit 314 of the cooperation application 310 transfers the authentication parameter 810 to the biometric authentication processing unit 332 of the authenticator 330 to perform the authentication request.

In S710, the biometric information request unit 334 of the authenticator 330 requests the biometric authentication to the user. In the request of the biometric authentication, a screen for prompting the user to input the biometric information is displayed. Hereinafter, the screen displayed in S710 will be described.

Figure 9B:
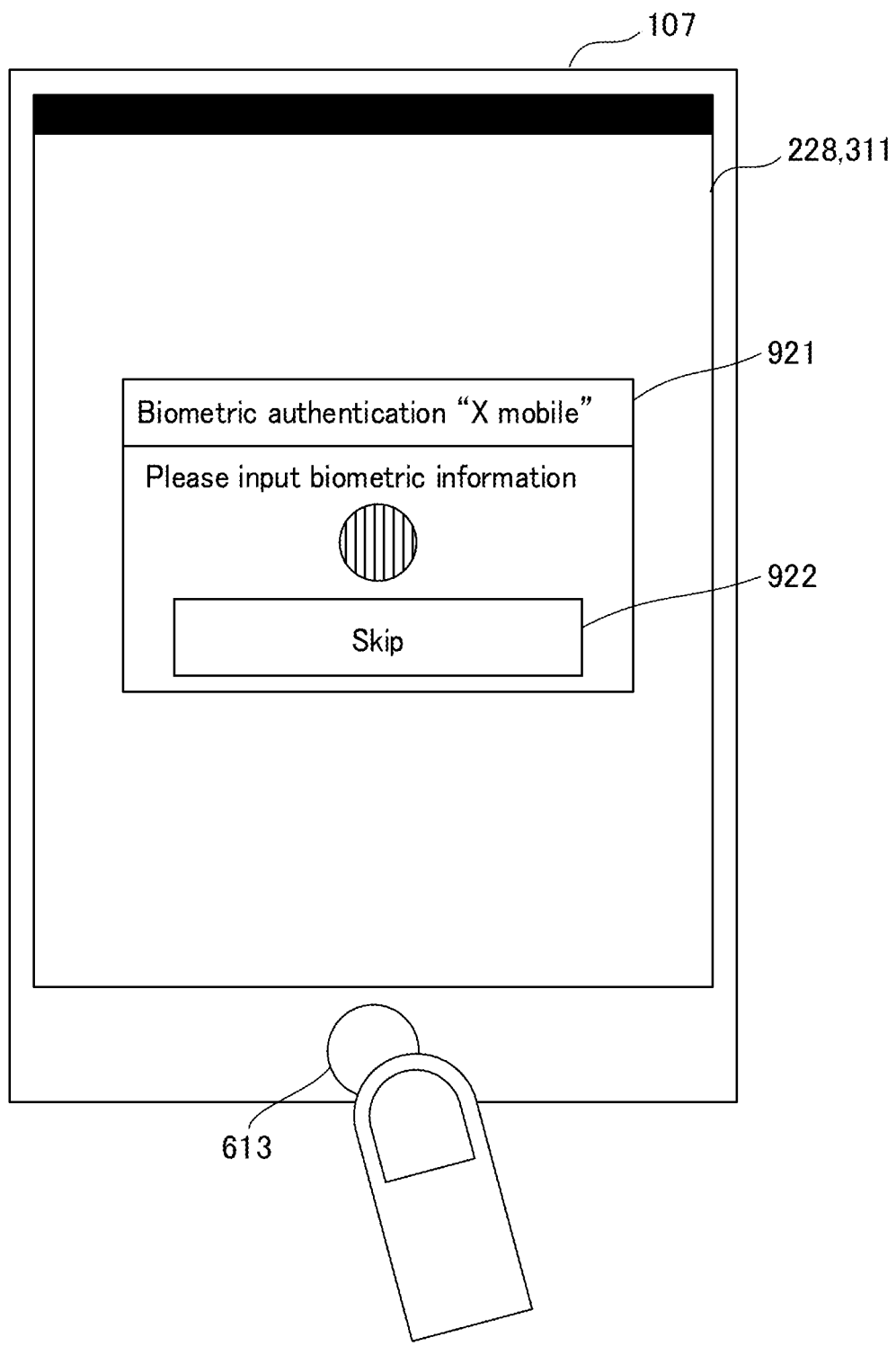

FIG. 9B is an example of the screen displayed on the display unit 311 of the cooperation application 310 when the authenticator 330 performs the biometric authentication.

An input screen 921 is displayed for each service 340 to be a target of the registration cancelation of the authenticator 330 and requests the user to input the biometric information used in the biometric authentication. In an example shown in FIG. 9B, an authentication for the service 340 "X-mobile" is requested.

In a case where a button 922 is pressed, the authentication request for the service 340 displayed on the input screen 921 is stopped, and the registration cancelation of the authenticator 330 in the service 340 is skipped. As described with reference to FIG. 6, the button 613 is the button for reading the biometric information such as a fingerprint and is included in the biometric information sensor 227. In a case where the user inputs the biometric information through the button 613, the biometric authentication processing unit 332 acquires the biometric information.

The description is returned to the description of FIG. 7. In S710, the biometric authentication processing unit 332 of the authenticator 330 acquires the biometric information through the input screen 921 (FIG. 6). In addition, the biometric authentication processing unit 332 creates assertion information. The assertion information is data used in the server 101 to verify that the user who performs the registration cancelation does not perform an illegal request. Hereinafter, the assertion information will be described.

FIG. 8C is a diagram illustrating an example of the assertion information.

Assertion information 820 includes an authentication information ID 821 and a signature 822. Hereinafter, a sequence in which the biometric authentication processing unit 332 acquires the authentication information ID 821 and the signature 822 configuring the assertion information 820 and creates the assertion information 820 will be described.

In S710, a record is specified from the authentication information management table (Table A) managed by the authentication information storage unit 333, based on the biometric information acquired by the biometric authentication processing unit 332 of the authenticator 330 through the input screen 921 (FIG. 9B). Specifically, the authentication information ID 821 and the secret key corresponding to the biometric information are specified in the authentication information management table (Table A) from specifying the biometric information ID indicating the acquired biometric information. That is, the authenticator 330 performs the biometric authentication and in a case where the authentication is successful, the secret key is acquired.

In addition, the biometric authentication processing unit 332 creates the signature 822 obtained by encrypting the assertion challenge 811 included in the authentication parameter 810 using the specified secret key. In addition, the biometric authentication processing unit 332 creates the assertion information 820 including the specified authentication information ID 821 and the created signature 822.

Here, a screen shown in FIG. 9C is displayed on the display unit 311 of the cooperation application 310.

A check screen 931 is a screen for notifying that the biometric authentication is completed in the portable terminal 107. In a case where a button 932 is pressed, the processing proceeds to next processing (S711).

The description is returned to the description of FIG. 7. In S711, the biometric authentication processing unit 332 returns the assertion information 820 created in S710 to the cooperation application 310. In S712, the communication unit 312 of the cooperation application 310 transmits the received assertion information 820 to the service 340.

In S713, the authenticator information processing unit 342 of the service 340 performs a verification of the received assertion information 820. Specifically, the authenticator information processing unit 342 decrypts the signature 822 included in the assertion information 820 using the public key specified by the authentication information ID 821 included in the assertion information 820.

In addition, a verification whether a decrypted value matches the assertion challenge 811 included in the authentication parameter 810 created in S707 is performed. In addition, in specifying the public key, the authenticator information management table (Table E) is used.

In S714, the authenticator information processing unit 342 requests the authenticator information storage unit 345 to delete the record of the authenticator information management table (Table E) having the authentication information ID 821 verified in S713. The authenticator information storage unit 345 deletes the record of which the deletion is requested, that is, cancels the registration.

In S715, the authenticator information processing unit 342 returns that the registration is canceled to the cooperation application 310. In S716, the cooperation application 310 is ended, and in order to repeat the processing of S703 to S715 with respect to a next service 340 that is a target of the registration cancelation of the authenticator 330, the processing is returned to the initialization application 320.

As described above, the present exemplary embodiment provides a mechanism in which the registration of the authenticator 330 of the service side is canceled using the initialization of the device as a trigger, by storing the registration cancelation URL on the device side, at the time of the registration of the authenticator 330. Therefore, it is possible to cancel the registration information of the authenticator of an unnecessary device from its own account stored in the service side at an appropriate timing.

In addition, in the present exemplary embodiment, an example in which the processing of the registration cancelation is repeated for each cooperation application 310 in a case where the device is initialized has been described. However, for example, in a case where the cooperation application 310 is uninstalled as a single unit, the processing corresponding to S704 to S715 may be executed. In addition, in the present exemplary embodiment, the portable terminal 107 is described as an example, however, as long as a device has the authenticator, the device may have a configuration different from the hardware and software of the portable terminal 107.

Second Exemplary Embodiment

In the first exemplary embodiment, when the device is initialized, the registration of the authenticator is canceled, by performing the authentication for each service 340 in which the authenticator 330 is registered in the device. However, in a case where a single device is used by a plurality of users, when attempting to cancel the registration of the authenticator from all services in which the authenticator is registered, the biometric information is requested to each of all users who perform the registration. However, this is not realistic because all users should be present on the place at the time of initializing the device.

Since the information such as the secret key stored in the TPM of the device is also deleted by the initialization of the device, the information on the authenticator registered in the service side is not used. Therefore, originally, the registration of the authenticator may be canceled without performing the authentication in the service, but there are two following problems.

First, since an impersonation is possible in the device, there is a point that in a case where the authentication is not performed, it is impossible for the service to determine whether or not the registration cancelation is requested due to the impersonation. The other point is a point that it seems that the registration has been canceled without knowledge oneself for a user different from the user who performs the initialization.

Therefore, in the present exemplary embodiment, means for urging the cancelation of the registration of the registration information that is unnecessary or ineffective in the service 340 according to the initialization of the device in a case where one device is used by a plurality of users will be described. In addition, the same reference numerals are given to the configurations common to those of the first exemplary embodiment and the description thereof will be omitted. In addition, hereinafter, a case where the device is the portable terminal 107 will be described, but the description is also applied to a case where the device is the PC 104.

<Example of Table on Side of Portable Terminal 107>

Hereinafter, the various pieces of data stored in the TPM 226 by the portable terminal 107 will be described using Table G and Table B'. In detail, table data shown in Table G and Table B' is data stored in the TPM 226 by the authentication information storage unit 333 of the authenticator 330 included in the portable terminal 107.

TABLE G

Device user authentication information management table

| Authentication information ID | Device user ID |
|---|---|
| 5a1c-ed28-ef22 | devuser001 |
| 98ea-b657-bf00 | devuser002 |
| 48ab-5ecb-ed54 | devuser003 |
| ... | ... |

The device user authentication information management table of Table G is a table obtained by extending the authentication information management table of Table A, and a record is created and added to the table G when the authenticator 330 is registered in the service. An authentication information ID column is the same as the authentication information ID of Table A. In a device user ID column, an ID for uniquely identifying a login account of the portable terminal 107 is stored. The device user ID is stored in association with the authentication information ID in the processing corresponding to S411 of the sequence (FIG. 4) of the processing of registering the authenticator 330 in the service 340.

TABLE B'

API management table

| Authentication information ID | Service ID | Application ID | Operation URL |
| --- | --- | --- | --- |
| 5a1-ed28-ef22 | z-market.com | z-market | { "deregister": "https://z-market.com/fido/deregister/user001", "notify": "https://z-market.com/fido/notify/user001" } |
| 98ea-b657-bf00 | z-market.com | z-market | { "deregister": "https://z-market.com/fido/deregister/user002", "notify": "https://z-market.com/fido/notify/user002" } |
| 48ab-5ecb-ed54 | z-market.com | z-market | { "deregister": "https://z-market.com/fido/deregister/user003", "notify": "https://z-market.com/fido/notify/user003" } |
| ... | ... | ... | ... |

The API management table of Table B' is similar to the table B of the first exemplary embodiment. A difference between Table B and Table B' is a point that the Table B' has an operation URL column instead of the registration cancelation URL column of Table B. In the operation URL column, data of key•value that is a set of an operation name of an operation to be performed with respect to each record of the Table B' and a request destination (URL) for requesting the operation is stored.

Similarly to the registration cancelation URL in the first exemplary embodiment, when the authenticator 330 is registered in the service 340, the operation URL is transferred from the service 340 through the cooperation application 310. In detail, the operation URL is included in the authentication extension region 514 of the registration parameter 510 (FIG. 5A) as the response (S407) and is transferred from the service 340 to the cooperation application 310. In addition, when the cooperation application 310 performs the creation request (S408) of the credential on the authenticator 330, the operation URL is transferred to the authenticator 330 as the registration request parameter 520 included in the request.

In Table B', in the operation URL column, operation names having "deregister" (cancelation) and "notify" (notification) are included. In the operation (URL) corresponding to the operation name having the "deregister", similarly to the registration cancelation URL of Table B, a request destination (URL) for requesting the registration cancelation of the authenticator 330 is stored. In the operation (URL) corresponding to the operation name having the "notify", a request destination (URL) of a notification for urging the registration cancelation of the authenticator.

For example, a case where the registration cancelation of the authenticator is performed when a user of which a device user ID is "devuser001" initializes the portable terminal 107 is considered. At this time, in the device user authentication information management table (Table G), the authentication information ID in which the device user ID is associated with "devuser001" is specified. In addition, the API management table (Table B'), regarding the record having the authentication information ID, similarly to the first exemplary embodiment, the processing of the registration cancelation (FIG. 7) is performed.

Specifically, regarding the record of the API management table (Table B') indicated by the authentication information ID associated with "devuser001", it is possible to transmit the request of the registration cancelation to the service 340 by transmitting the request to the URL of which the operation name is "deregister".

However, regarding the record of the user having the device user ID other than "devuser001" using the portable terminal 107, S710 may not be executed due to the reason described above in some cases. Therefore, in the device user authentication information management table, regarding the record of the API management table (Table B') indicated by the authentication information ID associated with the device user ID other than "devuser001", the request is transmitted to the URL of which the operation name is "notify".

Therefore, it is possible to transmit the request to the service 340 to notify the user having the device user ID other than "deuser001" that the cancelation of the registration information registered by oneself is urged, with respect to the service 340. In addition, the processing of transmitting the request to the URL of "notify" described above is performed by the initialization application 320 on the service 340 after the repetition processing of S703 to S716 is ended.

That is, the initialization application 320 transmits the request to the URL of "notify". Similarly to the request to the registration cancelation URL, the transmitted request is processed by the extension request processing unit 346 of the service 340, but the authentication processing (S713) is not performed.

Figure 10A:
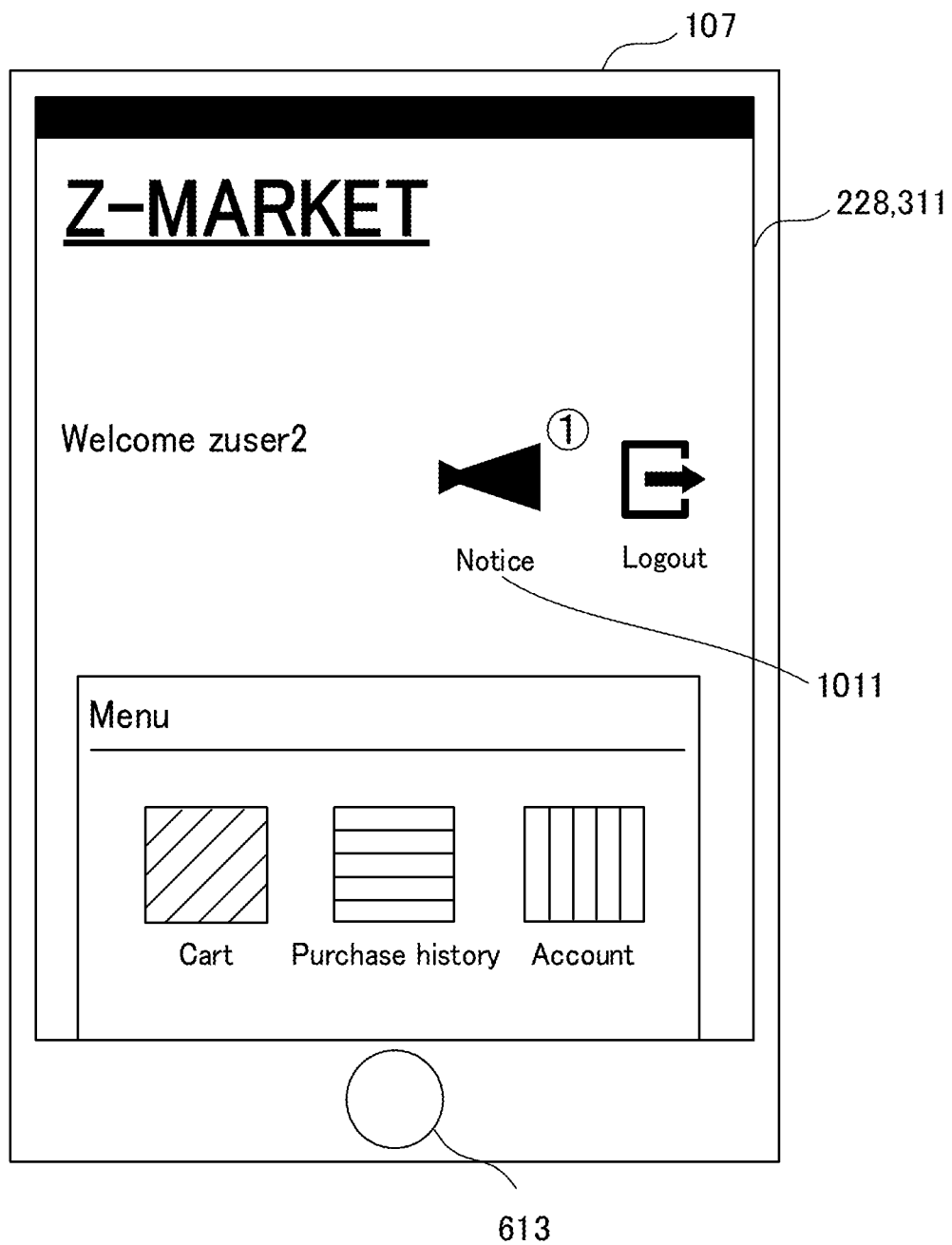
FIGS. 10A and 10B are diagrams illustrating an example of a screen displayed by service after the initialization of the portable terminal.
Figure 10B:
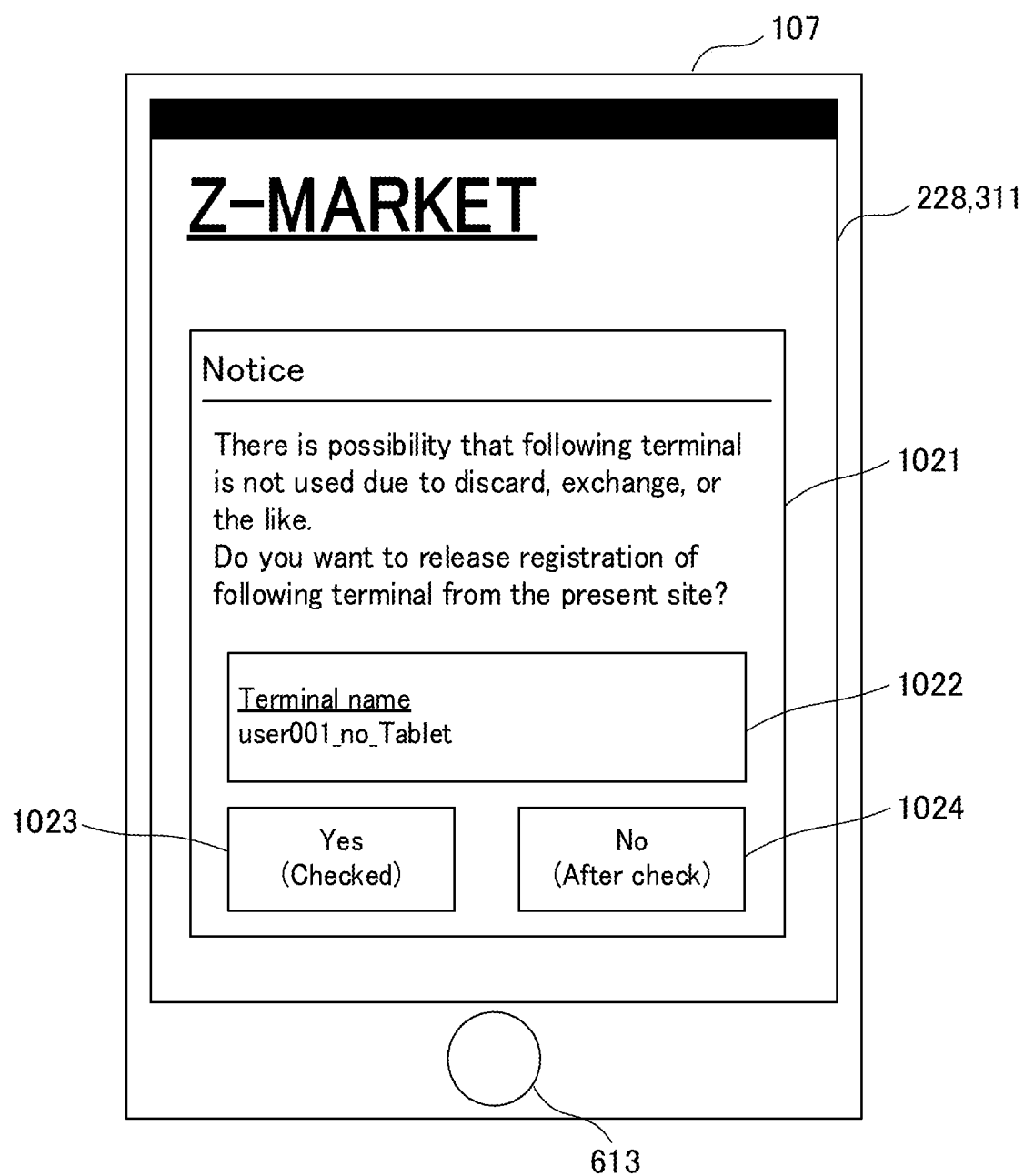

FIGS. 10A and 10B illustrate an example of a notification to the user other than "devuser001".

In detail, FIGS. 10A and 10B are shown when the user other than "devuser001" logs in the service 340 from a device different from the initialized portable terminal 107 after the initialization of the portable terminal 107.

FIG. 10A is an example of a screen displaying a web site provided by the service 340. An icon 1011 is an icon for displaying a notification such as a mail or a message to the logged-in user. In a case where the icon 1011 is pressed, details of the notification are displayed.

FIG. 10B is an example of a screen displaying the details of the notification. A notification screen 1021 is a screen showing a notification content of a web site provided by the service 340. In an area 1022, the information on the portable terminal 107 that transmitted the request to the request destination (URL) of the notification described above is displayed. In a case where a button 1023 is pressed, the record of the corresponding authenticator 330 is deleted in the authentication information management table (Table E), and the registration of the authenticator 330 registered in the service 340 is canceled. In a case where a button 1024 is pressed, the notification screen 1021 is closed without anything.

As described above, in the present exemplary embodiment, when a user initializes the device that is shared by a plurality of users, in a case where there is a service 340 in which another user registered the authenticator, the notification is performed to the other user. Therefore, it is possible to notify that the authenticator that has been registered becomes unnecessary according to the initialization while suppressing an illegal cancelation of the registration.

In addition, in the present exemplary embodiment, as the operation URL, "deregister" and "notify" are used, but the operation URL is not limited thereto. As the request destination for operating the registration information or the like of the service 340, an operation other than "deregister" and "notify" may also be used. In addition, as a communication protocol when the request is performed, the communication protocol is not limited to http or https, and as long as the communication protocol corresponds to the cooperation application 310 and the service 340, another protocol may also be used.

Third Exemplary Embodiment

In the first exemplary embodiment, the processing of canceling the registration of the authenticator (FIG. 7) when the device is initialized has been described. However, in a case where there are many registered service 340, it takes time to initialize the device, and which becomes a burden of the user.

In addition, in a case where a side of the service 340 does not correspond to the operation URL such as the registration cancelation URL as described in the first exemplary embodiment and the second exemplary embodiment, the registration of the authenticator 330 is not able to be canceled at the timing when the device is initialized. In addition, in a case where the side of the service 340 does not correspond to the operation URL such as the registration cancelation URL, it is impossible to notify that there is registration information which becomes unnecessary according to the initialization of the device. Therefore, there is a possibility that unnecessary registration may remain on the side of the service 340 unless the user of the device notices oneself.

Therefore, in the present exemplary embodiment, means for urging the registration cancelation of the authenticator to the user without using the registration cancelation URL or the operation URL, by using an account of another service different from the service 340 associated with the device. In addition, the same reference numerals are given to the configurations common to those of the first exemplary embodiment and the description thereof will be omitted. In addition, hereinafter, a case where the device is the portable terminal 107 will be described, but the description is also applied to a case where the device is the PC 104.

Figure 11:
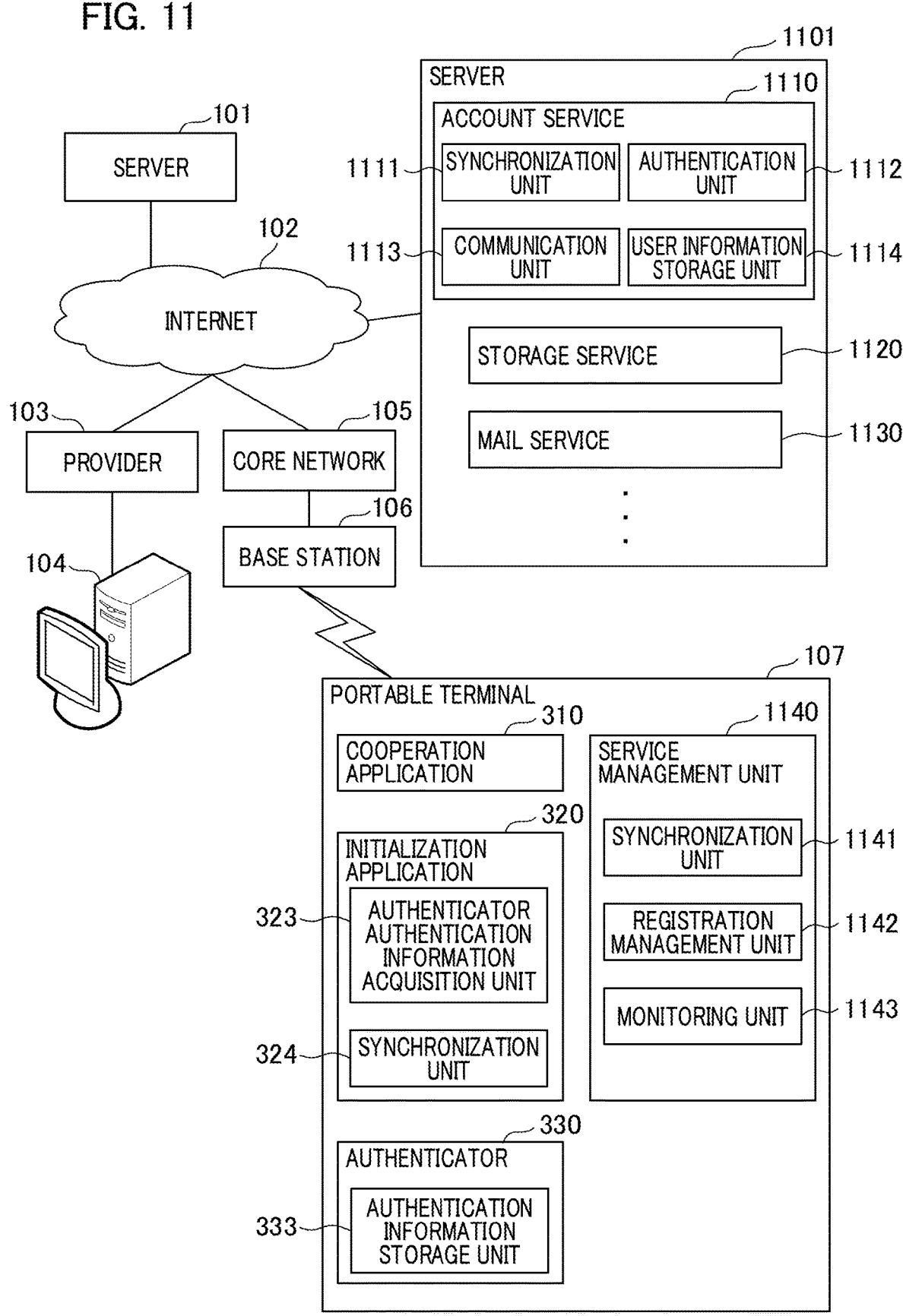
FIG. 11 is a diagram illustrating a network configuration and a software configuration of the system.

FIG. 11 is a diagram illustrating a network configuration and a software configuration example of a server 1101 and the portable terminal 107 in the present exemplary embodiment. In addition, a hardware configuration of the server 1101 is the same as the server 101, and the same reference numerals are given to the same configurations.

The network configuration shown in FIG. 11 is an extension of FIG. 1, and the server 1101 is added to the network configuration. First, the server 1101 will be described. The server 1101 is a server different from the server 101 providing the service 340. The server 1101 associates the PC 104 and the portable terminal 107 with the same account and provides various services.

The server 1101 has an account service 1110 as an example of a provided service. The account service 1110 includes a synchronization unit 1111, an authentication unit 1112, a communication unit 1113, and a user information storage unit 1114. The synchronization unit 1111 is a software module that provides a synchronization function for communicating with external equipment such as the PC 104 and the portable terminal 107 through the communication unit 1113 and sharing data with the equipment.

The authentication unit 1112 is a software module that provides an authentication function necessary for performing synchronization with the PC 104 or the portable terminal 107. The authentication function provided by the authentication unit 1112 is different from the authentication function provided by the service 340 described in the first exemplary embodiment and the second exemplary embodiment, as long as the authentication function is able to be realized, any means may be used. The communication unit 1113 is a software module for communicating with the external equipment such as the PC 104 or the portable terminal 107.

The user information storage unit 1114 is a software module for storing various attributes (data) associated with an account of the user. Data required in the present exemplary embodiment is stored in the user information storage unit 1114 or acquired from the user information storage unit 1114. A specific content of the data stored in the user information storage unit 1114 will be described later.

A storage service 1120 and a mail service 1130 are examples of other services provided by the server 1101, and the present invention is not limited thereto. The server 1101 may provide various other services.

Next, a software configuration example of the portable terminal 107 will be described with respect to points different from FIG. 3A. The portable terminal 107 includes a service management unit 1140 in addition to the cooperation application 310, the initialization application 320, and the authenticator 330. The initialization application 320 includes a synchronization unit 324 in addition to the authenticator authentication information acquisition unit 323.

The synchronization unit 324 is a software module that performs synchronization processing with the account service 1110 of the server 1101 when the initialization is performed in the portable terminal 107. Details of the synchronization processing will be described later.

The service management unit 1140 includes a synchronization unit 1141, a registration management unit 1142, and a monitoring unit 1143. The synchronization unit 1141 is a software module for communicating with the account service 1110 of the server 1101 and sharing data. The registration management unit 1142 is a software module that manages a registration state of the authenticator 330 of another device associated with the same account by the account service 1110, that is the authenticator 330 registered in the service 340.

The registration state of the authenticator 330 is shared between the devices such as the PC 104 and the portable terminal 107 associated with the same account by synchronizing the synchronization unit 1141 of the service management unit 1140 and the synchronization unit 1111 of the account service 1110. In addition, the shared data is managed by the registration management unit 1142. The monitoring unit 1143 is a software module having a function of monitoring whether the registration information of the authenticator 330 becomes unnecessary and notifying that registration information of the authenticator 330 becomes unnecessary in a case where the registration information of the authenticator 330 becomes unnecessary. Details of an operation of the monitoring unit 1143 will be described later.

<Example of Table Shared by Server 1101 and Device>

Hereinafter, various pieces of data shared by the server 1101 and the device will be described using Table H. In detail, table data shown by Table H is data stored in the storage device 210 or the external storage system (not shown) by each software module of the account service 1110 included in the server 1101.

In addition, the table data shown by Table H is data shared with the server 1101 by the synchronization unit 1141 of the service management unit 1140 included in the portable terminal 107 or the PC 104 and stored in the storage device 224 or 210 of the portable terminal 107 or the PC 104.

TABLE H

Authenticator initialization management table

| Initialization ID | Device name | Service ID | Notification flag |
|---|---|---|---|
| abc-123-def | ABC__no__tablet | x-mobile.com | TRUE |
| 987-zyx-654 | ABC__no__phone | z-market.com | TRUE |
| ... | ... | ... | ... |

The authenticator initialization management table of Table H is created for each account of the user of the account service 1110 and is managed by the user information storage unit 1114 of the account service 1110. One record indicates an entry of information on initialization in one device. In an initialization ID column, an ID that is issued when the device is initialized and is for uniquely identifying each initialization is stored.

In a device name column, a name of an initialized device is stored. In a service ID column, an ID the same as the service ID stored in Table A, that is an ID for uniquely identifying the service 340 in which the authenticator 330 is registered when the initialization is performed, is stored. In a notification flag column, a flag used for determining whether the registration information of the authenticator 330 is unnecessary by the monitoring unit 1143 of the device such as the portable terminal 107 and the PC 104 is stored.

Figure 12A:
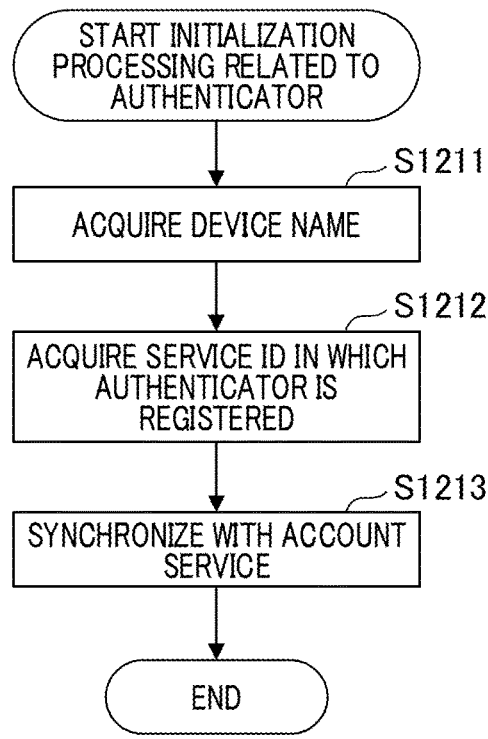
FIGS. 12A and 12B are flowcharts illustrating an operation according to the initialization of the portable terminal.

FIG. 12A is a flowchart illustrating a part of an operation of the initialization application 320 when the initialization is executed by the portable terminal 107.

In addition, in the present exemplary embodiment, a case where the initialization is executed in the portable terminal 107 will be described, but the case is the same as a case where the initialization is executed in the PC 104.

In a case where the user executes initialization processing that is the function of the initialization application 320 of the portable terminal 107, S1211 is executed. In S1211, the authenticator authentication information acquisition unit 323 of the initialization application 320 acquires a device name from the device to be initialized, that is, the portable terminal 107.

In S1212, the authenticator authentication information acquisition unit 323 acquires values of the service ID column of all records stored in the authentication information management table (Table A) through the authentication information storage unit 333. In S1213, the authenticator authentication information acquisition unit 323 issues an initialization ID and synchronizes information obtained by associating the device name acquired in S1211 and a list of the service ID acquired in S1212 with the initialization ID with the account service 1110. That is, information obtained by associating the initialization ID, the device name, the service ID, and the list of the service ID with the initialization ID is transmitted to the account service 1110.

In a case where the synchronization with the account service 1110 is performed, in the user information storage unit 1114 of the account service 1110, the authenticator initialization management table (Table H) to which the notification flag is given in addition to the synchronized initialization ID, the device name, and the service ID is created. In addition, a default value of the notification flag is set to "true".

Figure 12B:
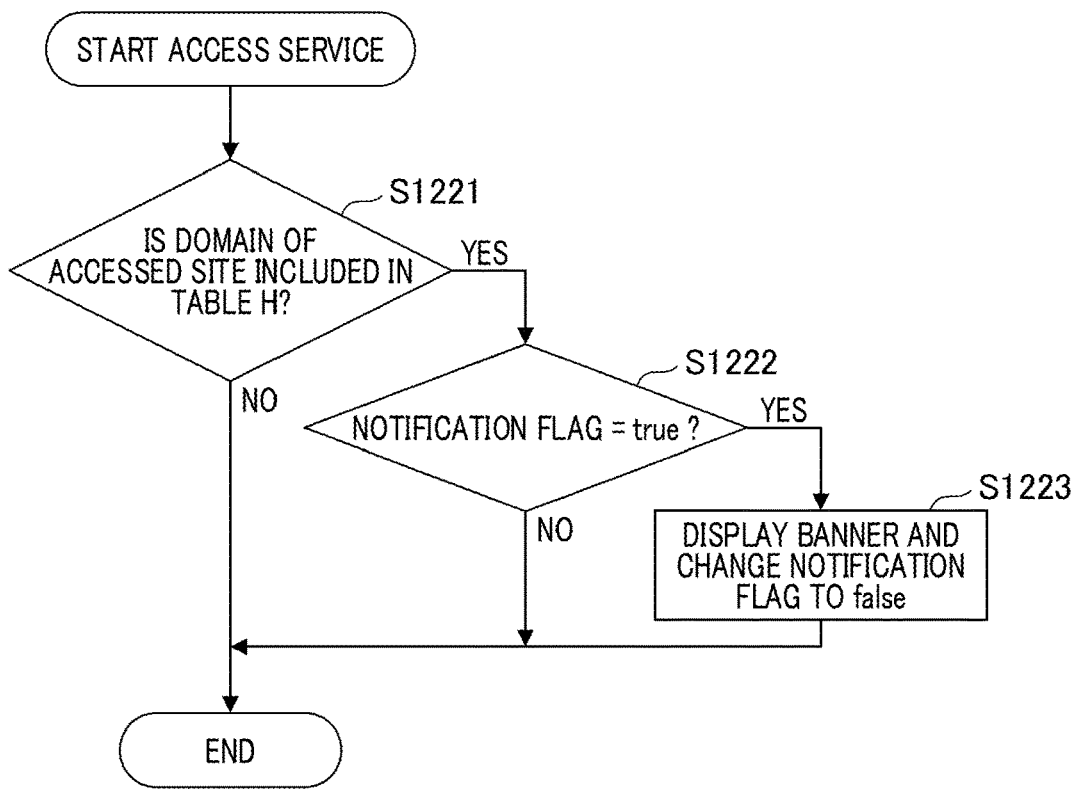

FIG. 12B is a flowchart illustrating an operation of the monitoring unit 1143 when the cooperation application 310 of a device different from the portable terminal 107 that executes the initialization accesses the service 340.

In addition, here, the device that accesses the service 340 is a device associated with the same account as the portable terminal 107 that executes the initialization processing.

In addition, it is assumed that the data of the authenticator initialization management table (Table H) is synchronized with the device, that is, acquired, by synchronizing the synchronization unit 1141 of the device with the synchronization unit 1111 of the account service 1110. The data acquired by the synchronization of the synchronization unit 1141 of the device is managed by the registration management unit 1142. Hereinafter, a flowchart of processing in a case where the synchronized device accesses the service 340 is shown.

In S1221, the monitoring unit 1143 of the device determines whether a domain name of the service accessed by the cooperation application 310 matches the service ID that is present in the authenticator initialization management table (Table H) managed by the registration management unit 1142. In addition, as described above, the service ID corresponds to the domain name of the service 340.

In a case where the domain name of the accessed service matches the service ID present in the authenticator initialization management table, the processing proceeds to S1222, and in a case where the domain name of the accessed service does not match the service ID present in the authenticator initialization management table, the processing is ended. In S1222, the monitoring unit 1143 determines whether the value of the notification flag column of the record having the service ID that is matched in S1221 is "true" in the authenticator initialization management table.

In a case where the value of the notification flag column is "true", the processing proceeds to S1223, and in a case where the value of the notification flag column is not "true", the processing is ended. In S1223, the monitoring unit 1143 performs a display for urging the registration cancelation of the authenticator 330 on the display unit 311 of the cooperation application 310 and changes the notification flag of a target record of the authenticator initialization management table to "false".

Figure 13:
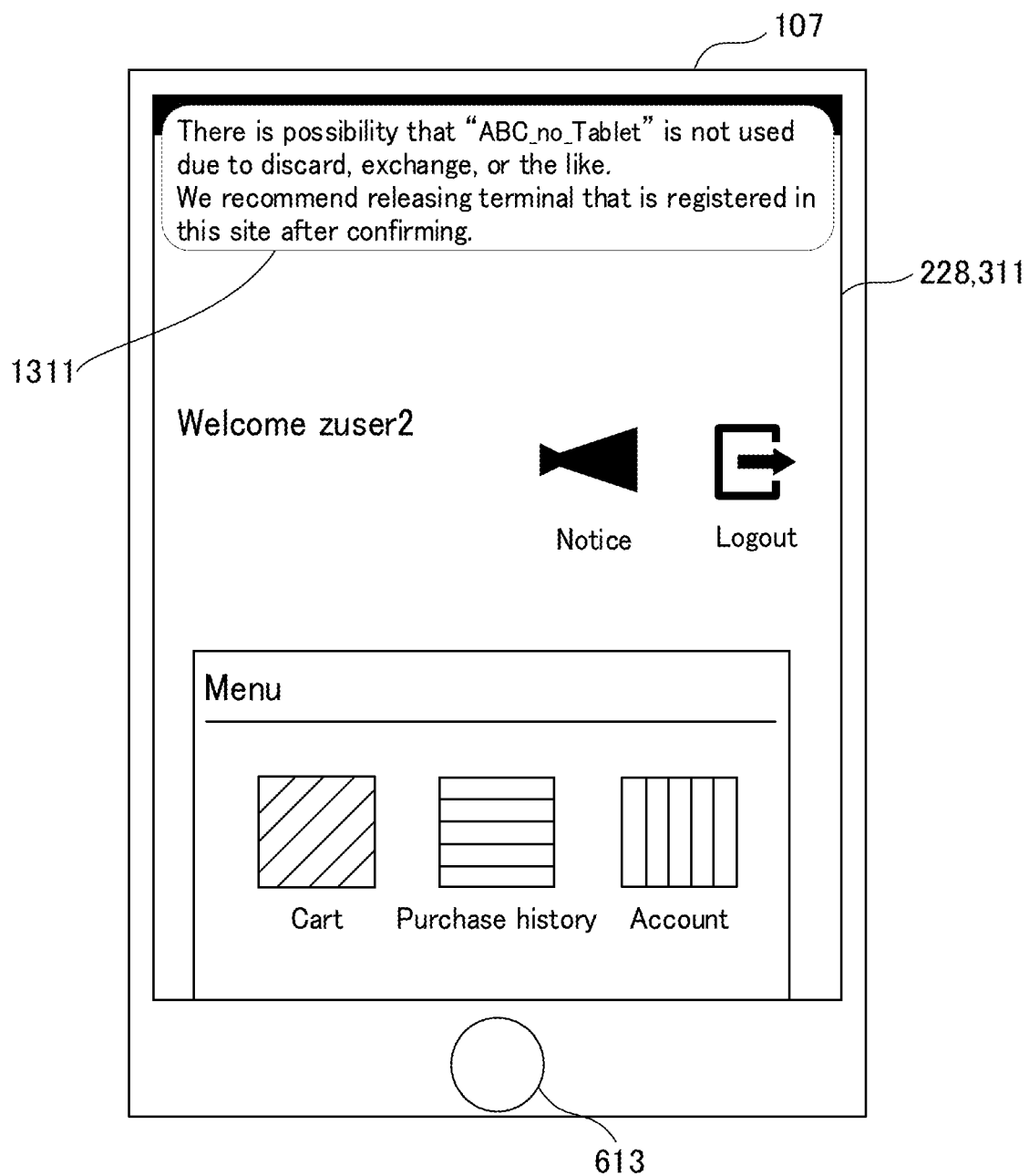
FIG. 13 is a diagram illustrating an example of a screen displayed by the service in the initialization of the portable terminal.

FIG. 13 is an example of a display displayed on the display unit 311 of the cooperation application 310 in S1223 and urging the registration cancelation of the authenticator 330.

In the present exemplary embodiment, a banner 1311 is displayed in the cooperation application 310, and a display for displaying the device of which the initialization is performed and urging the registration cancelation of the authenticator that is unnecessary according to the initialization of the device.

As described above, after initializing the device, when the service 340 (web site) on which the registration of the authenticator 330 of the device using an account is performed is accessed from another device using the same account, the banner 1311 is displayed. Therefore, even in a case where the service 340 does not correspond to the operation URL such as the registration cancelation URL or the like, it is possible to urge the registration cancelation of the unnecessary authenticator 330 to the user.

As described above, according to the present exemplary embodiment, the initialization of the device is monitored between devices using the same account using the account service 1110, and it is determined whether the registration information that is unnecessary according to the initialization is present. Therefore, even in a case where there are many services 340 in which the authenticator 330 is registered or a case where the service 340 does not correspond to the operation URL such as the registration cancelation URL or the like, it is possible to notify the user of the presence of the unnecessary registration information.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-168272, filed Sep. 1, 2017, which is hereby incorporated by reference wherein in its entirety.

What is claimed is:

1. An information processing apparatus that includes an authentication module for biometric authentication using biometric information read by a biometric information sensor and a storage unit configured to have tamper resistance for storing the biometric information of a user necessary when performing authentication processing with the authentication module and a secret key generated for the biometric information, the information processing apparatus comprising: a memory storing instructions; and a processor executing the instructions causing the information processing apparatus to: transmit a request for a registration cancelation using information of a request destination for the registration cancelation of the registration information to an external server in which the registration information including a public key which is a pair with the secret key is registered, at a time of initialization of an operating system (OS) of the information processing apparatus, wherein, when an authentication request for the registration cancelation is received from the server, a signature is generated using the secret key extracted according to an authentication success in the biometric authentication of the authentication module using the biometric information read by the biometric information sensor, and wherein, when the signature is successfully verified by being transmitted to the server, the registration cancelation of the registration information is performed in the server.

2. The information processing apparatus according to claim 1, wherein the information of the request destination for the registration cancelation is acquired from the server when the registration information is registered in the server.

3. The information processing apparatus according to claim 1, wherein the information of the request destination for the registration cancelation is managed by the authentication module.

4. The information processing apparatus according to claim 1, wherein identification information of the authentication module is further included the registration information.

5. The information processing apparatus according to claim 4, wherein the identification information of the authentication module is managed in association with a login account of the information processing apparatus.

6. The information processing apparatus according to claim 1, wherein the instructions further cause the information processing apparatus to transmit a request of a notification to another user who is a user of the information processing apparatus and is different from a user logged into the information processing apparatus at the time of the initialization of the OS of the information processing apparatus, using information of request destination for notifying the another user to perform the registration cancelation of the registration information registered in the external server by the another user.

7. The information processing apparatus according to claim 6, wherein the information of the request destination for notifying the another user to perform the registration cancelation is acquired from the server when the registration information is registered in the server.

8. The information processing apparatus according to claim 1, wherein the instructions further cause the information processing apparatus to:
    transmit information including a list of the external servers in which the registration information is registered by the information processing apparatus to a server that manages an account, at the time of the initialization of the OS of the information processing apparatus;
    acquire, from the external server that manages the account, information including the list of the external server, which is transmitted from another information processing apparatus that is associated with a same account with an account of the information processing apparatus; and
    perform a display indicating that a registration cancelation of registration information of the another information processing apparatus is necessary when accessing the list of the server included in the acquired information.

9. A method for controlling an information processing apparatus that includes an authentication module for biometric authentication using biometric information read by a biometric information sensor and a storage means (226) configured to have a storage means configured to have tamper resistance for storing the biometric information of a user necessary when performing authentication processing with the authentication module and a secret key generated for the biometric information, the method comprising: transmitting a request for a registration cancelation using information of a request destination for the registration cancelation of the registration information to an external server in which the registration information including a public key which is a pair with the secret key is registered, at a time of initialization of an operating system (OS) of the information processing apparatus, wherein, when an authentication request for the registration cancelation is received from the server, a signature is generated using the secret key extracted according to an authentication success in the biometric authentication of the authentication module using the biometric information read by the biometric information sensor, and wherein, when the signature is successfully verified by being transmitted to the server, the registration cancelation of the registration information is performed in the server.

10. A non-transitory storage medium on which is stored a computer program for making a computer execute a method for an information processing apparatus that includes an authentication module for biometric authentication using biometric information read by a biometric information sensor and a storage means configured to have tamper resistance for storing the biometric information of a user necessary when performing authentication processing with the authentication module and a secret key generated for the biometric information, the method comprising: transmitting a request for a registration cancelation using information of a request destination for the registration cancelation of the registration information to an external server in which the registration information including a public key which is a pair with the secret key is registered, at a time of initialization of an operating system (OS) of the information processing apparatus, wherein, when an authentication request for the registration cancelation is received from the server, a signature is generated using the secret key extracted according to an authentication success in the biometric authentication of the authentication module using the biometric information read by the biometric information sensor, and wherein, when the signature is successfully verified by being transmitted to the server, the registration cancelation of the registration information is performed in the server.

* * * * *